(12) United States Patent
Boulanger et al.

(10) Patent No.: US 10,174,887 B2
(45) Date of Patent: Jan. 8, 2019

(54) LIGHTING ARRANGEMENT WITH BATTERY BACKUP

(71) Applicant: CP IP Holdings Limited, Central Hong Kong (CN)

(72) Inventors: Dave Boulanger, Hong Kong (CN); Maciej Nowakowski, West Vancouver (CA)

( * ) Notice: Subject to any disclaimer, the term of this patent is extended or adjusted under 35 U.S.C. 154(b) by 0 days.

(21) Appl. No.: 16/032,321

(22) Filed: Jul. 11, 2018

(65) Prior Publication Data

US 2018/0335185 A1  Nov. 22, 2018

Related U.S. Application Data

(63) Continuation-in-part of application No. 15/248,665, filed on Aug. 26, 2016, now Pat. No. 10,039,161, which is a continuation-in-part of application No. 14/986,760, filed on Jan. 4, 2016, now Pat. No. 9,921,364, and a continuation-in-part of application No. 14/956,416, filed on Dec. 2, 2015.

(60) Provisional application No. 62/210,464, filed on Aug. 27, 2015, provisional application No. 62/099,492, filed on Jan. 3, 2015, provisional application No. 62/086,820, filed on Dec. 3, 2014.

(51) Int. Cl.
| | |
|---|---|
| *F21V 15/04* | (2006.01) |
| *F21L 4/08* | (2006.01) |
| *H05B 33/08* | (2006.01) |
| *F21V 21/03* | (2006.01) |
| *F21V 23/00* | (2015.01) |
| *F21V 19/00* | (2006.01) |
| *H02J 9/06* | (2006.01) |

(52) U.S. Cl.
CPC ............ *F21L 4/08* (2013.01); *F21V 19/0015* (2013.01); *F21V 21/03* (2013.01); *F21V 23/002* (2013.01); *H02J 9/065* (2013.01); *H05B 33/0818* (2013.01); *H05B 33/0842* (2013.01)

(58) Field of Classification Search
None
See application file for complete search history.

(56) References Cited

U.S. PATENT DOCUMENTS

| | | |
|---|---|---|
| 3,739,226 A | 6/1973 | Seiter et al. |
| 5,768,814 A | 6/1998 | Kozek et al. |
| 6,082,871 A | 7/2000 | Yeh |
| 8,333,491 B1 | 12/2012 | Chou et al. |

(Continued)

FOREIGN PATENT DOCUMENTS

GB          2500797 A          10/2013

*Primary Examiner* — Vip Patel

(57) ABSTRACT

A lighting arrangement can include a light emitter portion and a battery backup portion. The light emitter portion can have a plurality of light emitting diodes and circuitry including a rectifier for driving the light emitting diodes. The battery backup portion can be in electronic communication with the rectifier of the light emitter portion and have a battery portion and a converter portion with a DC-AC inverter and a microcontroller unit configured to route AC power to the rectifier from either a primary AC source or the battery portion. The light emitter portion can be configured to be mounted to a junction box and positioned below a ceiling of a dwelling space during use. The battery backup portion can be configured to be selectively positionable between the light emitter portion and the junction box.

20 Claims, 29 Drawing Sheets

(56) References Cited

U.S. PATENT DOCUMENTS

| | | | |
|---|---|---|---|
| 8,362,713 B2 * | 1/2013 | Recker | H05B 33/0803 |
| | | | 307/44 |
| 8,519,566 B2 * | 8/2013 | Recker | H02J 9/065 |
| | | | 307/64 |
| 2009/0203260 A1 | 8/2009 | Vogt et al. | |
| 2010/0061076 A1 | 3/2010 | Mandy et al. | |
| 2010/0187852 A1 | 7/2010 | Reck | |
| 2012/0268894 A1 | 10/2012 | Alexander et al. | |
| 2013/0342342 A1 | 12/2013 | Sabre et al. | |
| 2014/0092608 A1 | 4/2014 | Moser et al. | |
| 2014/0240966 A1 | 8/2014 | Garcia et al. | |
| 2016/0230973 A1 | 8/2016 | Shaw | |

* cited by examiner

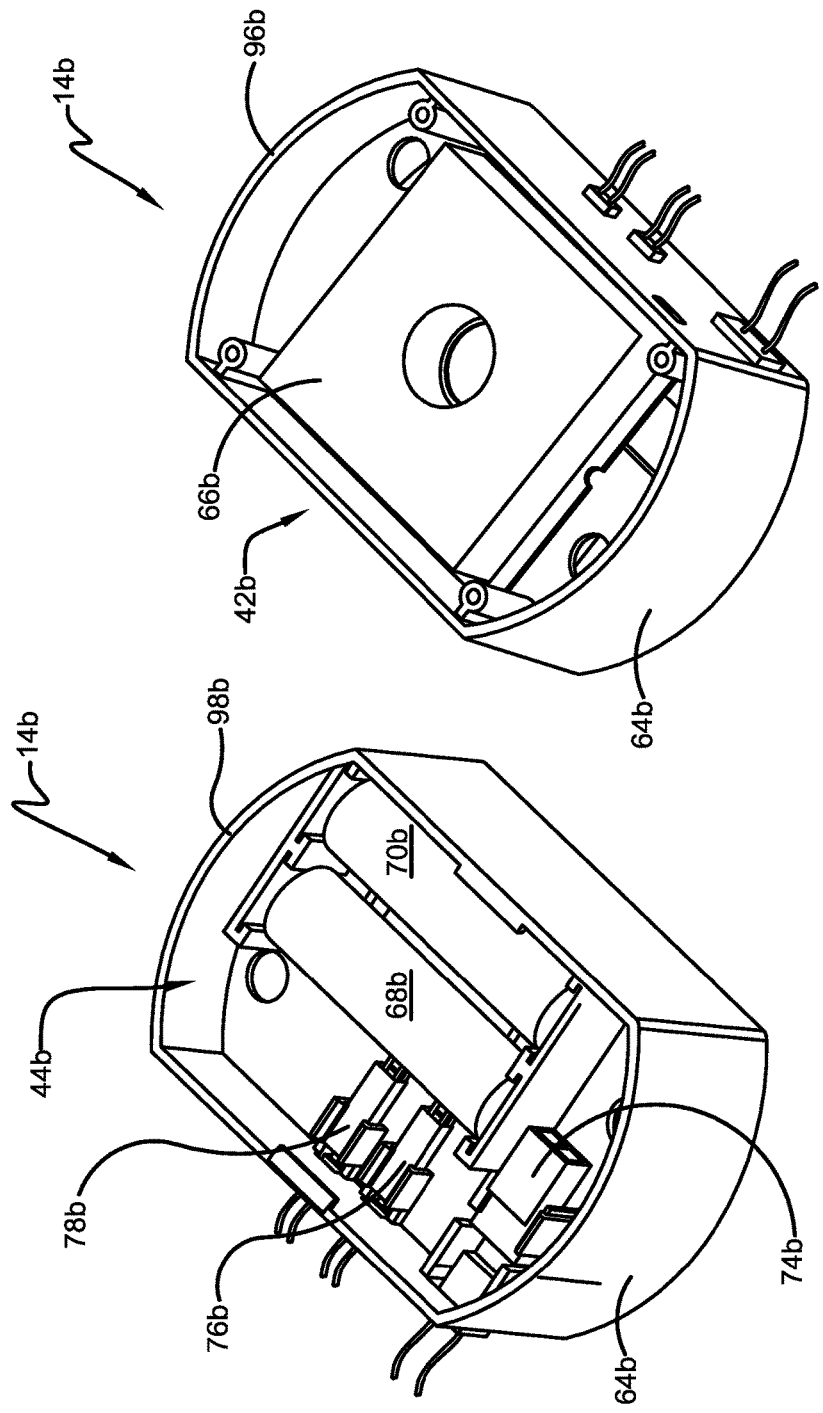

LIGHTING ARRANGEMENT WITH BATTERY BACKUP

CROSS-REFERENCE TO RELATED APPLICATIONS

This application is a continuation-in-part of pending U.S. patent application Ser. No. 15/248,665 for a LIGHTING ARRANGEMENT WITH BATTERY BACKUP, filed on 8 Aug. 2016, which is hereby incorporated by reference in its entirety. This application is also a continuation-in-part of pending U.S. patent application Ser. No. 14/956,416 for a LIGHTING ARRANGEMENT, filed on 2 Dec. 2015, which is hereby incorporated by reference in its entirety. This application also claims the benefit of U.S. Provisional Patent Application Ser. Nos. 62/210,464; 62/086,820; and 62/099,492; which are hereby incorporated by reference in their entireties. This application is also a continuation-in-part of pending U.S. patent application Ser. No. 14/986,760 for a LIGHTING ARRANGEMENT, filed on 4 Jan. 2016, (now U.S. Pat. No. 9,921,364, issued 20 Mar. 2018) which is hereby incorporated by reference in its entirety.

BACKGROUND

1. Field

The present disclosure relates to structures operable to emit light.

2. Description of Related Prior Art

U.S. Pat. No. 8,376,777 discloses a QUICK MOUNTING DEVICE WITH MODULES. The quick mounting device for appliances is alleged to be quickly and easily engaged and disengaged mechanically without the use of tools. U.S. Pub. No. 2012/0187852A1 discloses an ELEVATOR EMERGENCY LED LIGHTING POWER SUPPLY ASSEMBLY. An elevator emergency LED lighting power supply assembly including an inverter that receives DC power from a battery and outputs backup power to LED lamps of an elevator lighting system. An LED driver is connected to the inverter, is connectable to an LED lamp of the elevator lighting system, receives AC power from the inverter, and outputs DC power sufficient to power an LED lamp. A relay is connected between the inverter and the LED driver, is connectable to a primary elevator electrical power supply, and allows AC power to flow from a primary elevator electrical power supply to elevator lighting system LEDs through the LED driver as long as AC power is available from a primary elevator electrical power supply. Upon loss of power from the primary elevator power supply the relay switches contacts and provides to the LED driver AC power received from the inverter.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A lighting arrangement can include a light emitter portion and a battery backup portion. The light emitter portion can have a plurality of light emitting diodes in an array string and circuitry for driving the plurality of light emitting diodes. The circuitry can include a rectifier and an IC chip configured to drive the plurality of light emitting diodes, with the rectified voltage provided by the rectifier. The light emitter portion can also have a trim. The plurality of light emitting diodes in the array string and the circuitry can be mounted on the trim. The battery backup portion can be in electronic communication with the rectifier of the light emitter portion and have a battery portion with one or more batteries and a converter portion with a DC-AC inverter. The converter portion can be connected to the rectifier and can be configured to receive power from the one or more batteries or a primary AC source. The converter portion can include a microcontroller unit configured to route AC power to the rectifier from either the primary AC source or the battery portion when said light emitter portion and said battery backup portion are engaged with one another. The light emitter portion can be configured to be mounted to a junction box and positioned below a ceiling of a dwelling space during use. The battery backup portion can be configured to be selectively positionable between the light emitter portion and the junction box.

BRIEF DESCRIPTION OF THE DRAWINGS

The detailed description set forth below references the following drawings:

FIG. 10 is a perspective view from a top perspective looking downward of a battery backup of the third exemplary lighting arrangement;

FIG. 11 is a perspective view from a bottom perspective looking upward of a battery backup of the third exemplary lighting arrangement;

DETAILED DESCRIPTION

Figure 1:
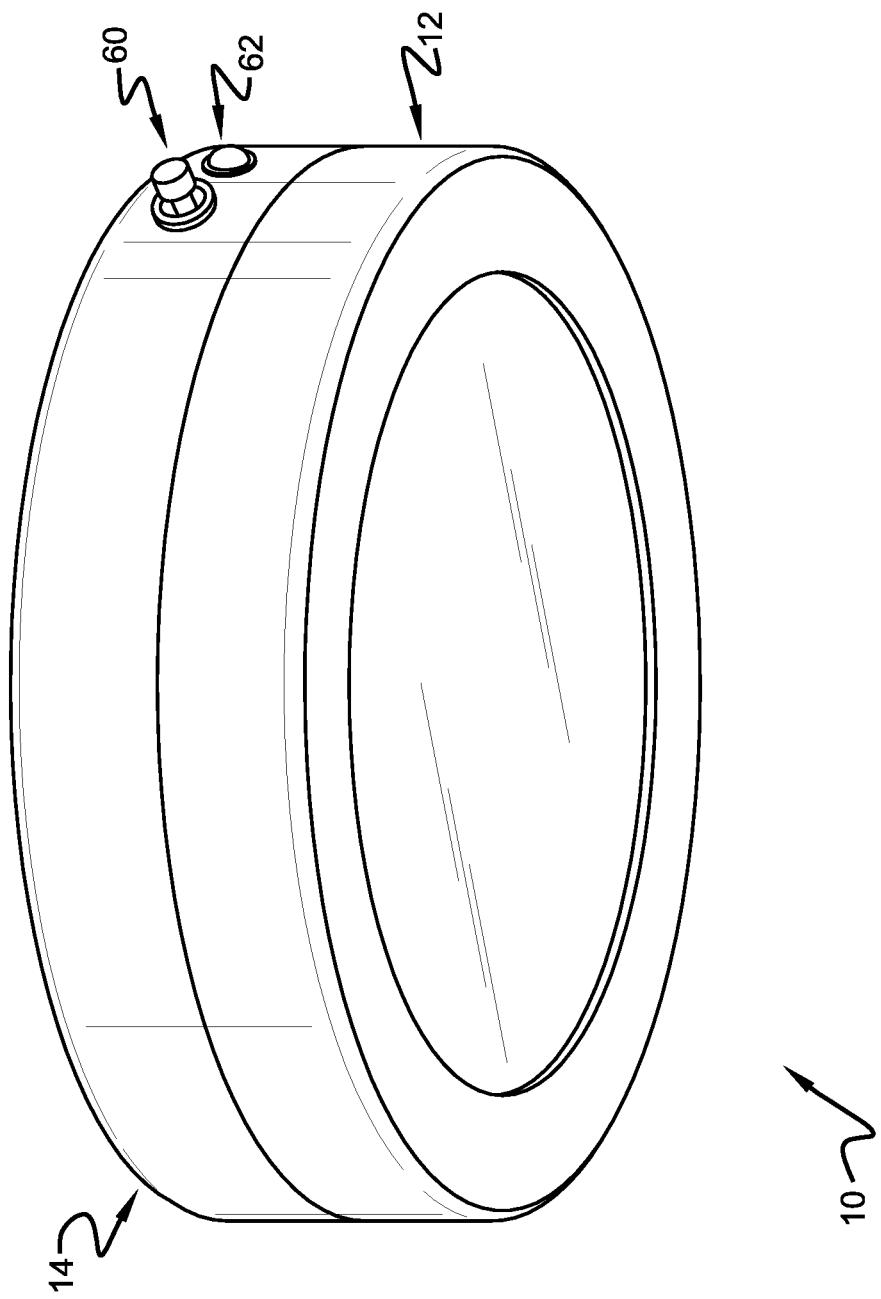
FIG. 1 a perspective view of a lighting arrangement having a battery backup for operation according to an exemplary embodiment of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

Figure 2:
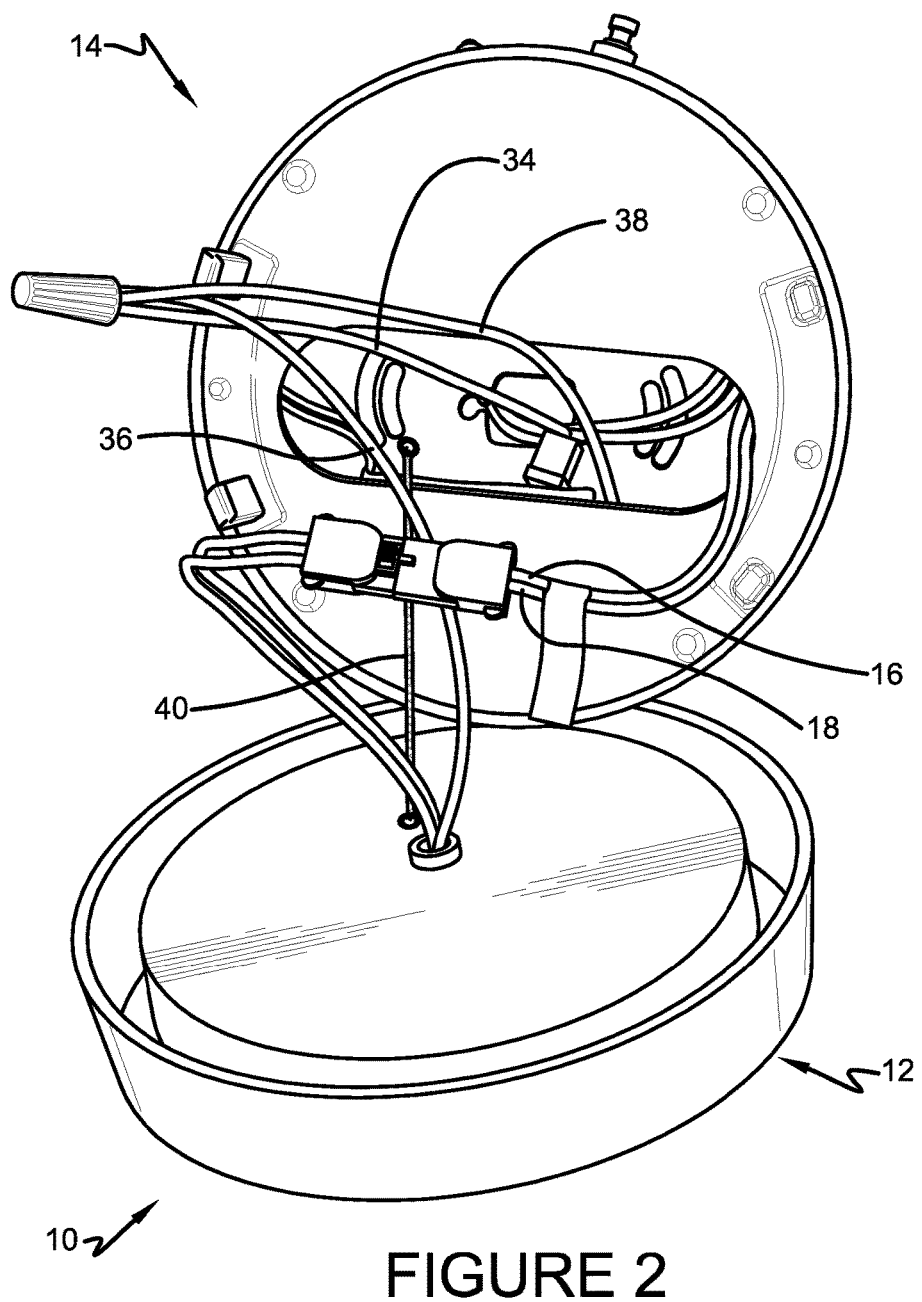
FIG. 2 is a perspective view of the lighting arrangement shown in FIG. 1 with a light emitter portion partially unattached from a battery backup portion.
Figure 3:
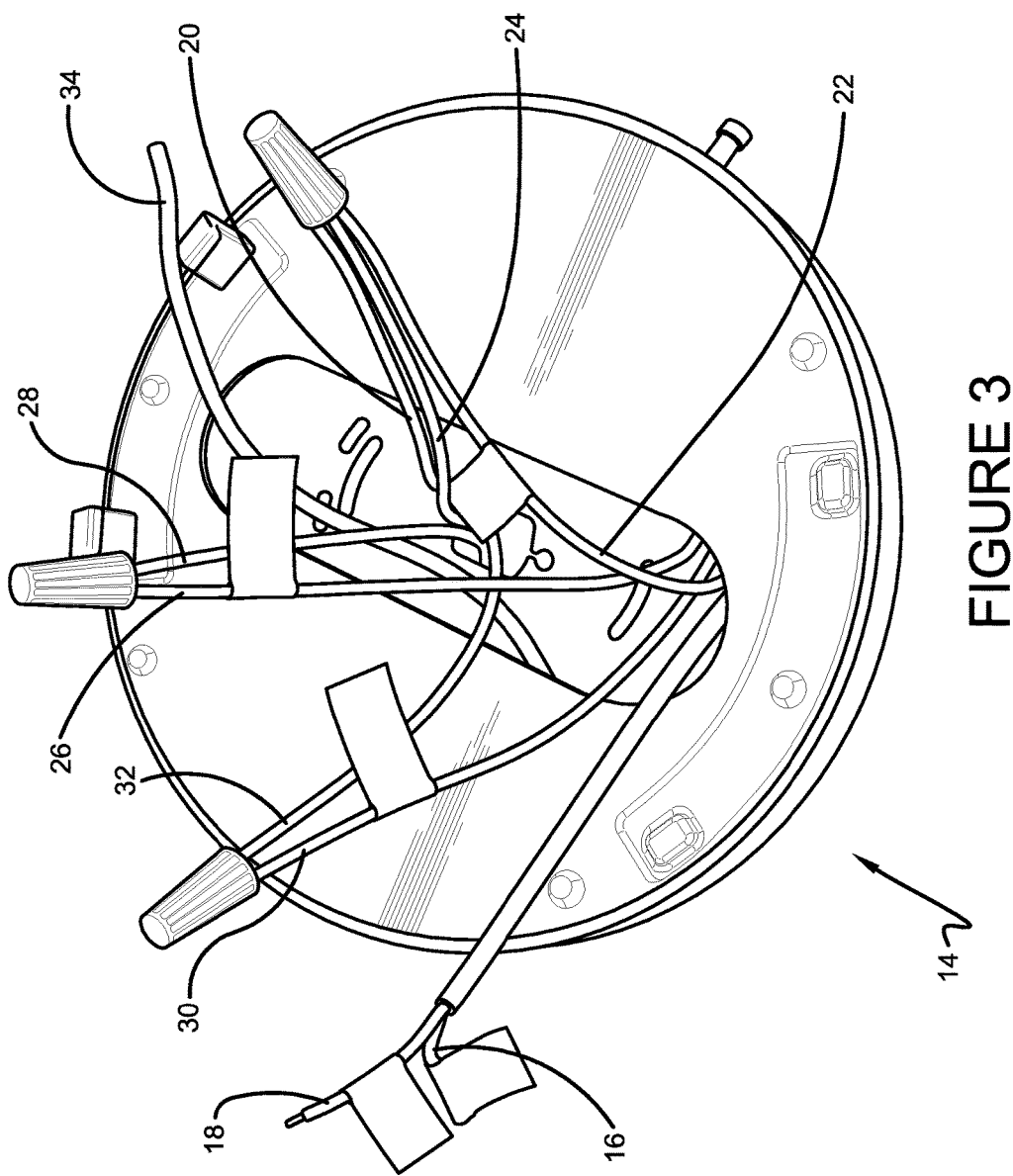
FIG. 3 is a perspective view of the battery backup portion of the lighting arrangement shown in FIGS. 1 and 2.
Figure 4:
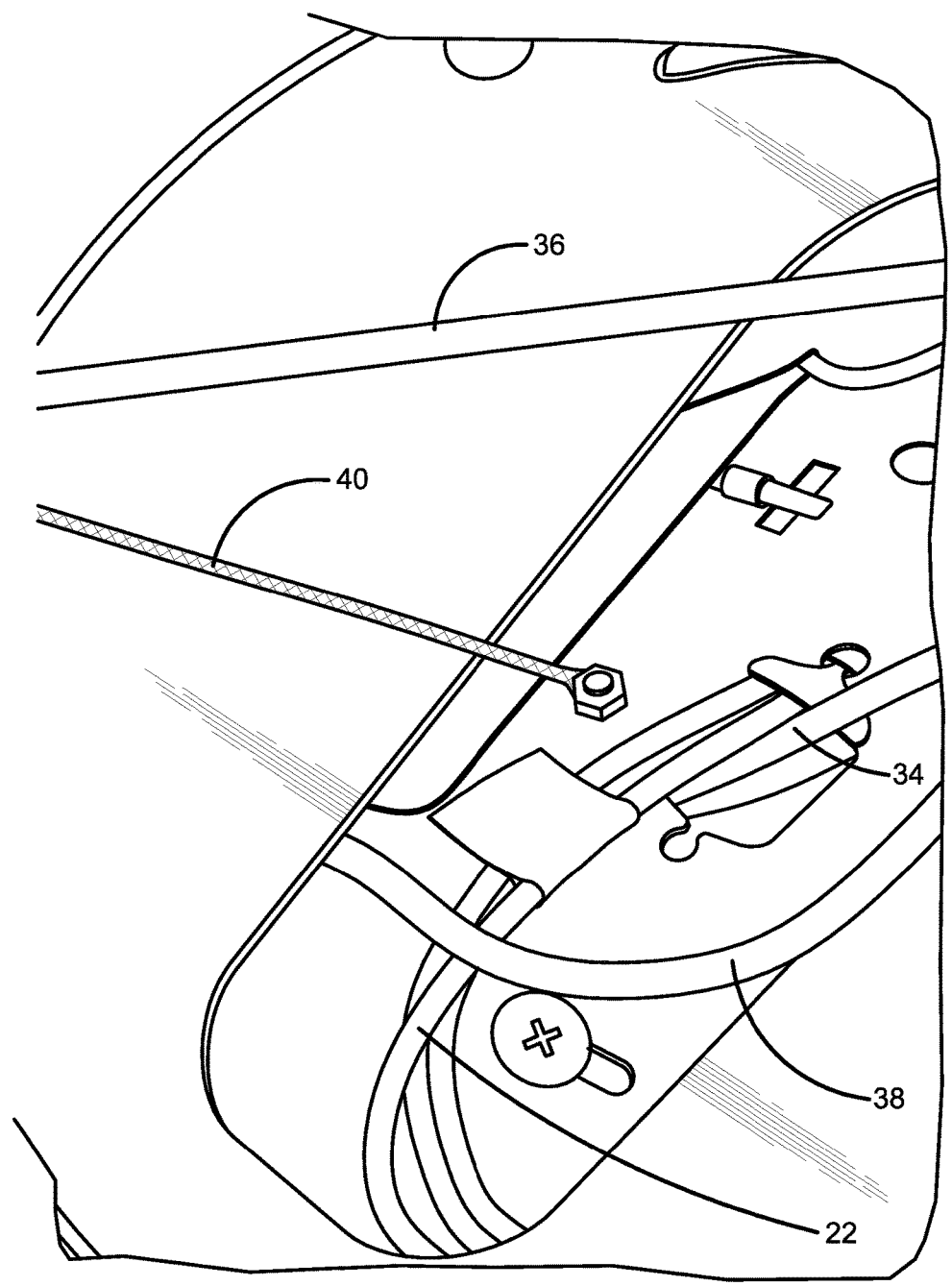
FIG. 4 is a magnified view of the structures shown in FIG. 3.

FIG. 1 is a perspective view of an exemplary lighting arrangement 10 according to the present disclosure. FIG. 2 is a perspective view of the lighting arrangement 10 shown in FIG. 1 with a light emitter portion 12 partially attached to a battery backup portion 14. FIG. 3 is a perspective view of the battery backup portion 14 of the lighting arrangement shown in FIGS. 1 and 2. FIG. 4 is a magnified view of the battery backup portion 14. The circuit schematic shown in FIG. 5 is applied in the embodiment.

In FIG. 3, leads 16, 18 can extend to an LED array of the light emitter portion 12 from the battery backup portion 14. Leads 20, 22, and 24 can define a neutral connection. Leads 26, 28, can define a continuous, un-switched connection to the LED array of the light emitter portion 12 through the lead 18. AC from a standard, primary or regular or non-emergency source can be supplied to the LED array of the light emitter portion 12 through leads 18, 26, 28. Leads 30, 32, can define a switched connection to the LED array of the light emitter portion 12 through the lead 18. AC from a battery of the battery backup portion 14 can be supplied to the LED array of the light emitter portion 12 through leads 18, 30, 32 when the standard or regular or non-emergency source has failed. Lead 34 can define a ground connection. A ground 36 from the LED array of the light emitter portion 12 and a ground 38 from the standard or regular or non-emergency source can be spliced to the ground lead 34.

The battery backup portion 14 can allow the light emitter portion 12 to function as it would function under the standard or regular or non-emergency source. The light emitter portion 12 can be fully functional, including dimmable. The battery backup portion 14 can be mounted directly to a junction box. When the leads have been connected, the leads can be arranged inside the battery backup portion 14. The battery backup portion 14 can be connected to the light emitter portion 12 through a safety wire 40. The safety wire 40 can ease installation and prevent completion separation of the light emitter portion 12 from the battery backup portion 14. The battery backup portion 14 can also include a test circuit with a push test button, referenced at 60 in FIG. 1. The LED 62 and the test button 60 are mounted in the battery backup portion 14. When the button 60 is pressed, an LED 62 will be powered by the battery backup portion 14 if the battery backup portion 14 has power.

Figure 5:
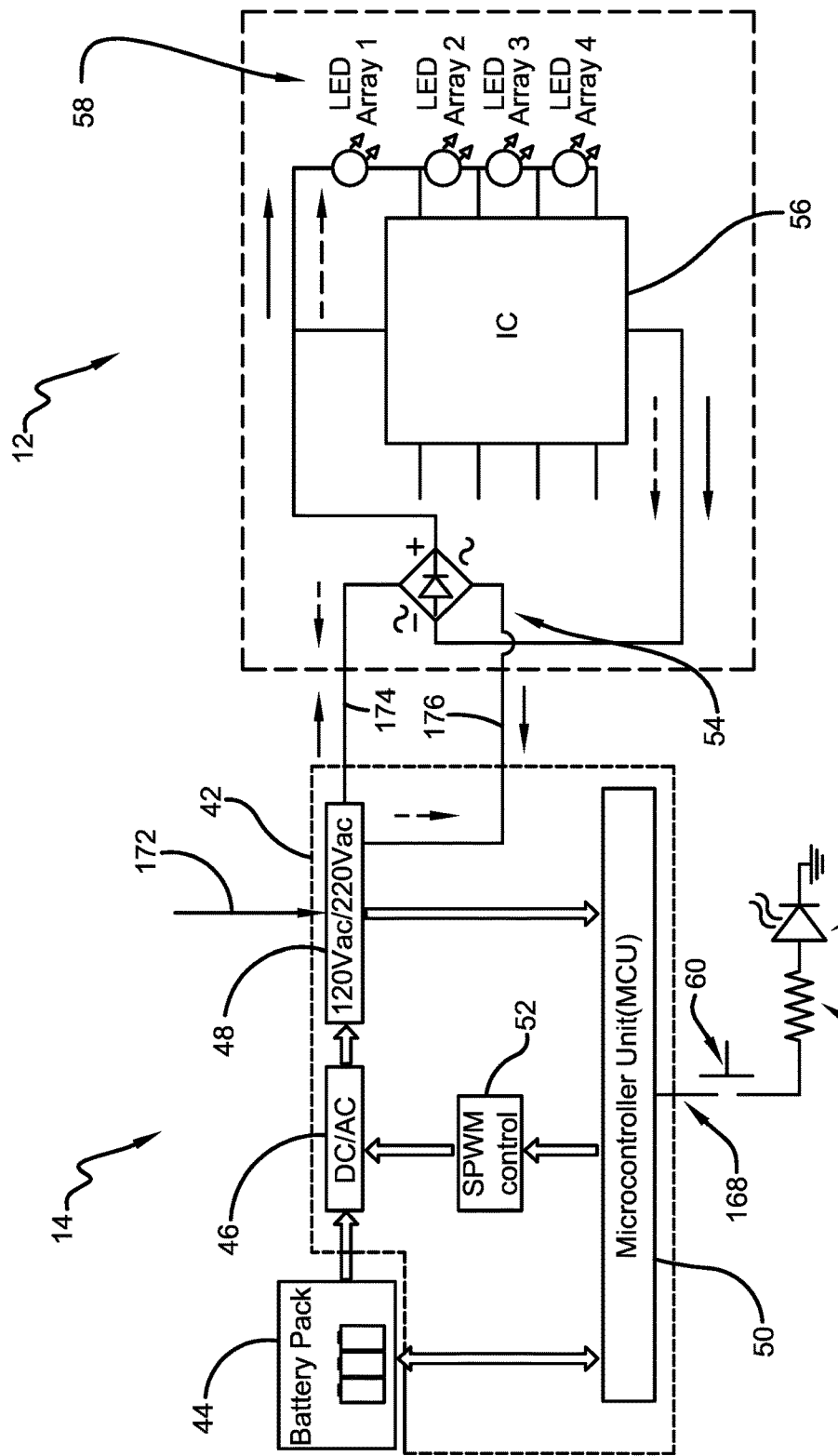
FIG. 5 is a circuit schematic of the circuit incorporated in the lighting arrangement shown in FIGS. 1-4.

FIG. 5 is a circuit schematic according to an exemplary embodiment of the present disclosure. The exemplary embodiment shown in FIG. 5 provides a driver circuit for the light emitter portion 12 shown in FIGS. 1-4. A prior art driver circuit is a relatively large structure, but the exemplary embodiment can provide a chip mounted on the light emitter portion 12. The chip can tightly control voltage fluctuations. As a result, a battery for powering the light emitter portion 12 during an outage can be smaller in terms of physical size or power rating than would otherwise be required.

The battery backup portion 14 can include converter portion 42 and a battery portion 44. The converter portion 42 can be operably disposed between the battery portion 44 and the light emitter portion 12. The converter portion 42 can itself be powered by the battery portion 44. The battery portion 44 can have any desired physical size. The battery portion 44 can be defined by a single battery or an array of batteries connected in series or in parallel. By way of example and not limitation, the battery portion 44 can include one or more Samsung® Model ICR18650-26F batteries, each having a length of sixty-five millimeters and a diameter of eighteen and four-tenths millimeters. This yields a volume of seventeen-thousand two-hundred and eighty-four cubic millimeters. The battery portion 44 can be rated at 3.8 volts, 2600 mAh and have a capacity is 9.88 Wh after being charged. In one embodiment of the present disclosure, three batteries can be connected in series having a volume of fifty-one-thousand eight-hundred and fifty-one cubic millimeters.

The converter portion 42 can include a DC-AC converter 46. The DC-AC converter 46 can be a functional group that includes a plurality of components such as a transistor, diode, capacitor, and transformer. The DC-AC converter 46 can convert relatively low DC voltage from the battery portion 44 into AC voltage. The box 48 simply refers to the output of the converter portion 42.

The converter portion 42 can also include a microcontroller unit 50. The microcontroller unit 50 can include voltage dividers, amplifiers, RAM, a timer, A/D, PWM, and other integrated functions. In one or more embodiments of the present disclosure, the microcontroller unit 50 can include an enhanced 8051 series MCU, such as a SH79F081A provided by Sino Wealth, alongside voltage dividers and amplifiers that enable the high voltages and currents to be measured by the A/D.

The converter portion 42 can also include a sinusoidal pulse-width modulation (SPWM) module 52. The SPWM module 52 can be integral with the microcontroller unit 50. The SPWM module 52 can generate a sinusoidal modulated pulse in response to a control signal emitted by the microcontroller unit 50 to SPWM module 52. The pulse can be utilized to control the ON/OFF status of a transistor of the converter 46, such as a MOSFET. When the transistor is open, the converter portion 42 can be engaged to communicate AC power to a rectifier 54. The microcontroller unit 90 can be arranged to monitor the delivery of AC power to the light emitter portion 12 from a primary source of power, such as the grid. When the primary or main electrical power is off due to an emergency, or power outage, or some other condition, the microcontroller unit 50 can emit the pulse to engage the other portions of the converter portion 42 and supply power to the light emitter portion 12.

The battery portion 44 and converter portion 42 can define an emergency back-up to the light emitter portion 12. The battery portion 44 and converter portion 42 can be formed as an integral battery backup portion 14 that can be attached to the junction box delivering electrical power to the light emitter portion 12. Wire nuts can connect the three (3) wires available for connection into junction box.

In one or more exemplary embodiments, the battery portion 44 can provide thirty watt-hours of power. When supporting a twenty watt light emitter portion 12 (or fixture), the battery portion 44 can thus provide power for one and a half hours. The power can be provided almost instantaneously; when power is lost from the standard or regular or non-emergency source, the micro-controller 50 can engage the inverter circuit 46 to supply 120V, AC power to the light emitter portion 12.

The output signal of the converter portion 42 is directed through the bridge rectifier 54. The signal can be received by an IC chip 56. The light emitter portion 12 can control individual LEDs of an LED array string 58 based on the input voltage. The quantity of LEDs can be variable. Unlike a traditional arrangement, the light emitter portion 12 can be configured to drive the IC chip 56 directly in relatively high voltage rectified AC mode and not to transform relatively high voltage rectified AC to low voltage DC. IC chip 56 is configured to provide device appropriate current flow into the LED array string 58. Many different step-IC chips can be utilized in various embodiments of the present disclosure, depending on different functions that may be desired, such as dimming or particular color dimming for differently colored LEDs. One example of a step-IC that can be utilized in one or more embodiments of the present disclosure for the IC chip 56 is a MAP9001 supplied by MagnaChip Semiconductor. The MAP9001 has the ability to accept voltages between 90V and 270V rectified voltage.

A connection to the grid is referenced at 172. AC from the rectifier 54 can pass to the rectifier 54 from the box 48 along line 174. AC from the rectifier 54 can return to the box 48 along line 176 (neutral). The power flow is illustrated with solid and dashed arrows. Because the AC is rectified there are two half cycles. In the positive half cycle (solid arrows), the power flows from line 174, through the rectifier 54, and out of the terminal marked (+), around to the LED string 58, through the chip 56, back through the rectifier 54, and then to neutral 176. During the negative half cycle (dashed arrows), the power flows from neutral 174, through the rectifier 54, out of the terminal marked (+), through the LED string 58, through the chip 56, back through the rectifier 54, and then through the line 174.

The arrangement described above results in the unexpected benefit of a smaller backup battery along with the number of light emitting diodes (LEDs) being variable based on the battery voltage.

FIG. 5 illustrates one approach to connecting the button 60 and LED 62 to the circuit. The microcontroller 50 can be measuring/monitoring the voltage of the battery portion 44. The microcontroller 50 can include an output referenced at 168 that is connected to the LED 62 through the switch 60 and a resistor 170. The microcontroller 50 can be configured to turn on the output 168 when the battery portion 44 is charged; thus, when the user presses the button 60, the LED 62 would illuminate. If the battery portion 44 were not charged, the output 168 would be off and pressing the button 60 not cause the LED 62 to illuminate.

In the first exemplary embodiment, the battery backup portion 14 and the light emitter portion 12 are fixed directly together. Also, the exemplary light emitter portion 12 and the exemplary battery backup portion 14 have substantially the same outer profile, as shown in FIG. 1. The exemplary light emitter portion 12 and the exemplary battery backup portion 14 can thus both be exposed after installation without aesthetic concerns. The exemplary light emitter portion 12 and the exemplary battery backup portion 14 can be mounted on a ceiling or on a wall, both visible.

Figure 6:
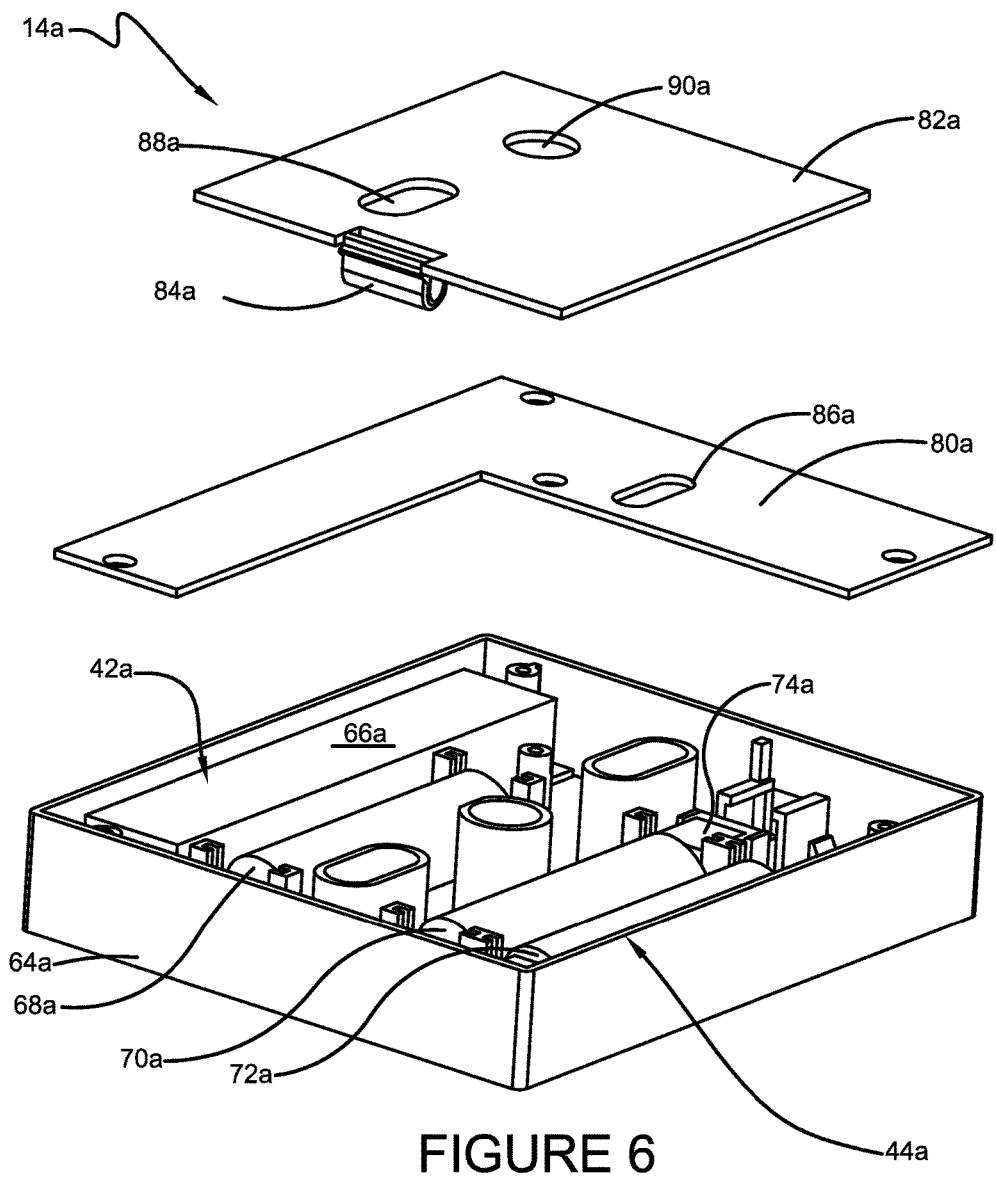
FIG. 6 is an exploded view of a second exemplary battery backup according to one or more implementations of the present disclosure.
Figure 7:
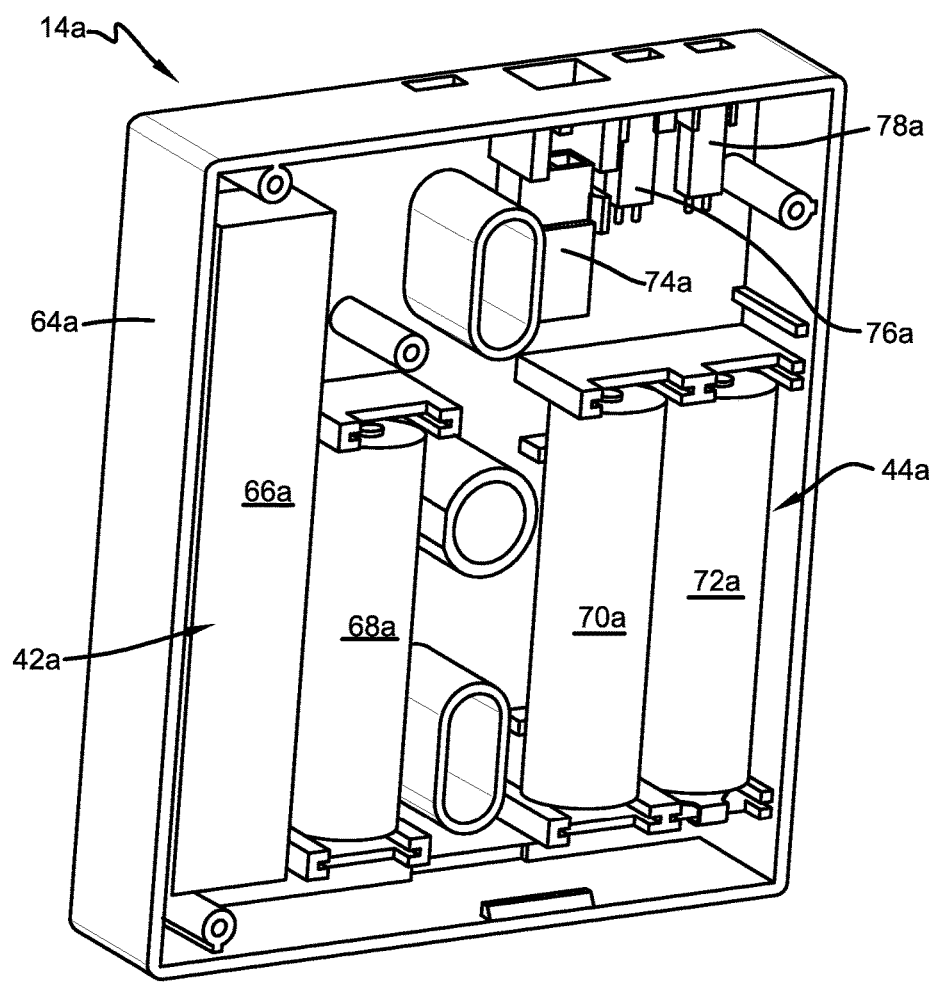
FIG. 7 is a rear perspective view of the second exemplary battery backup shown in FIG. 6 with covers removed to show internal structures.
Figure 8:
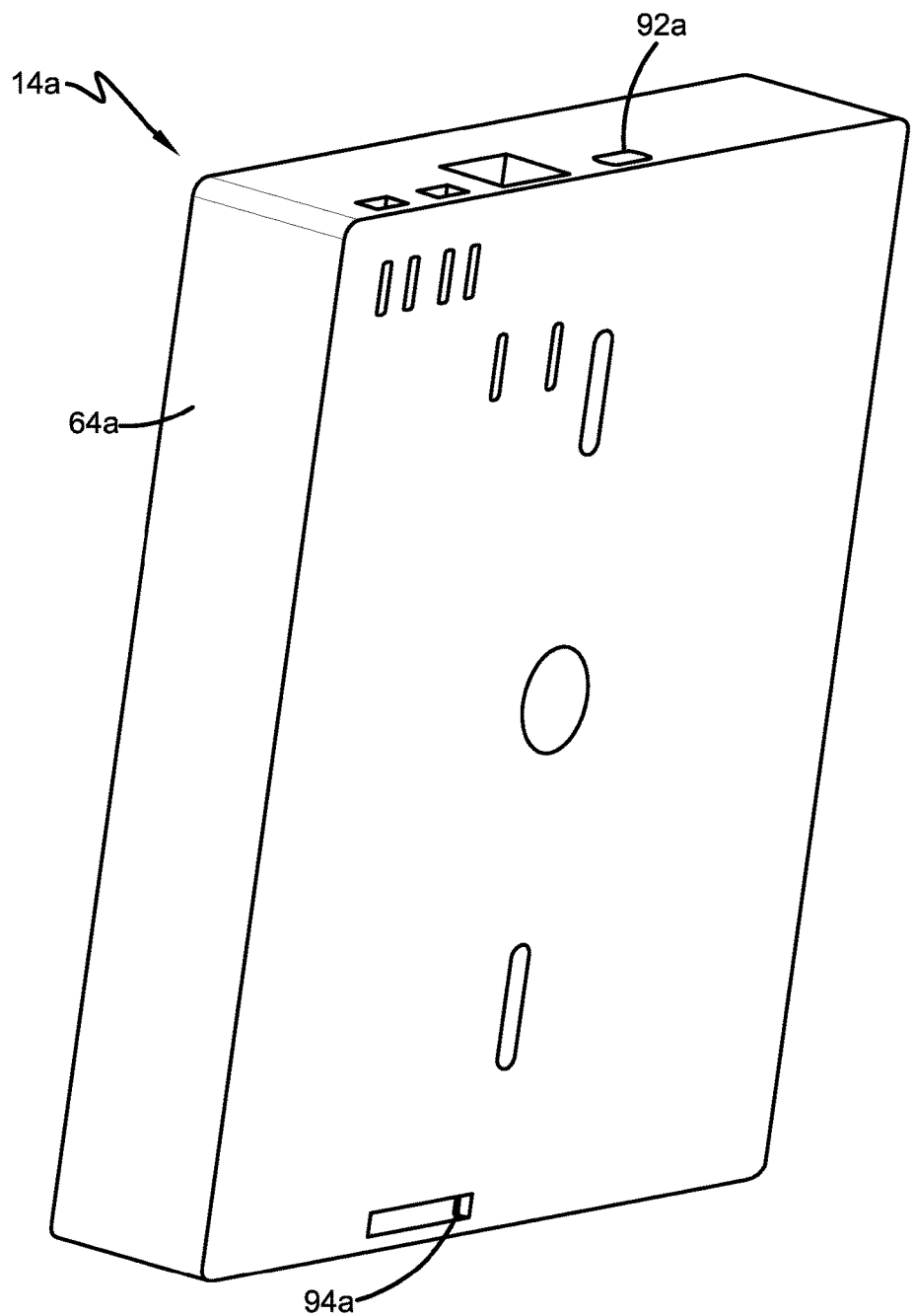
FIG. 8 is a front perspective view of the second exemplary battery backup shown in FIG. 6.
Figure 9:
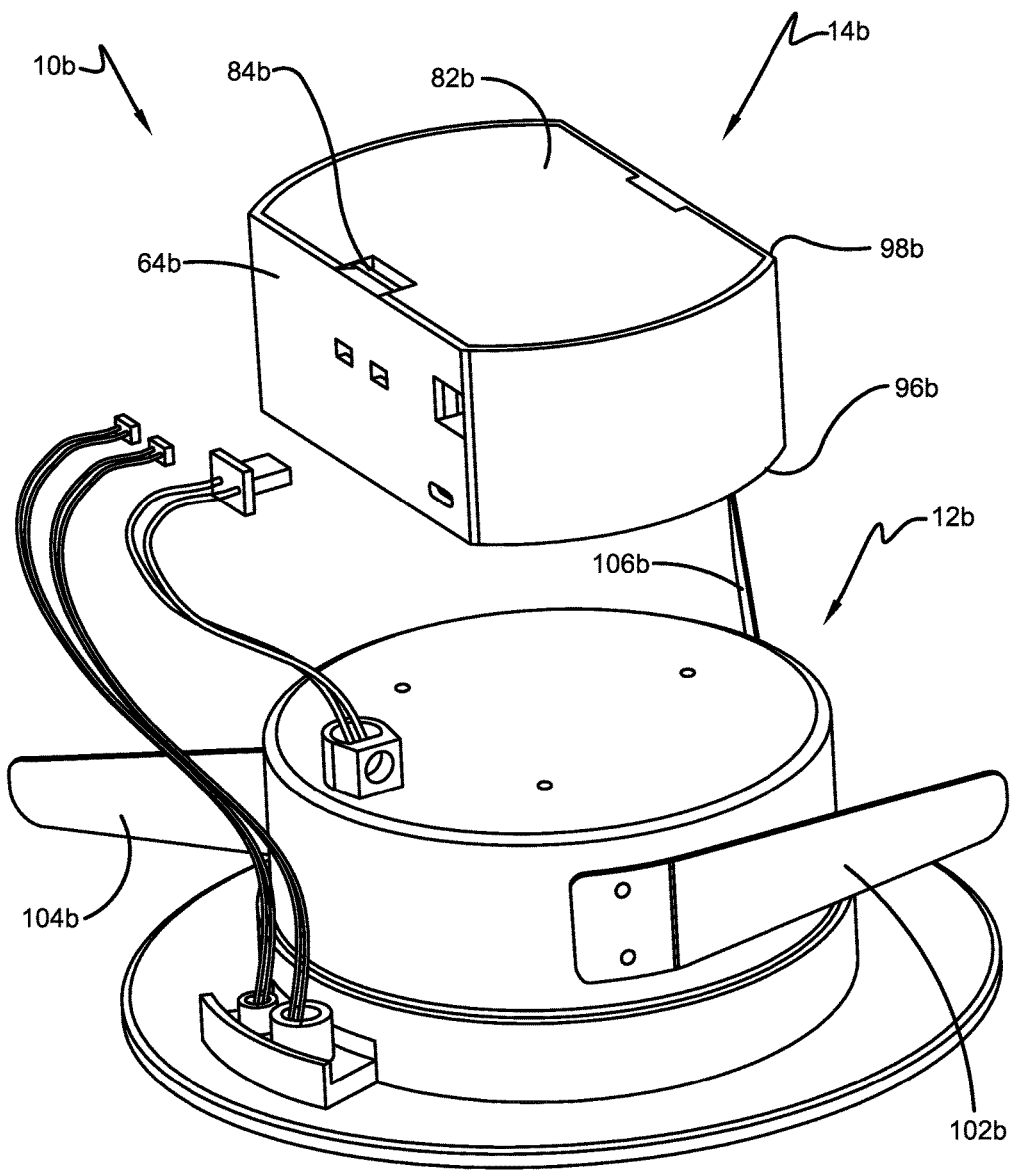
FIG. 9 is an exploded view of a third exemplary lighting arrangement according to one or more implementations of the present disclosure.
Figure 12:
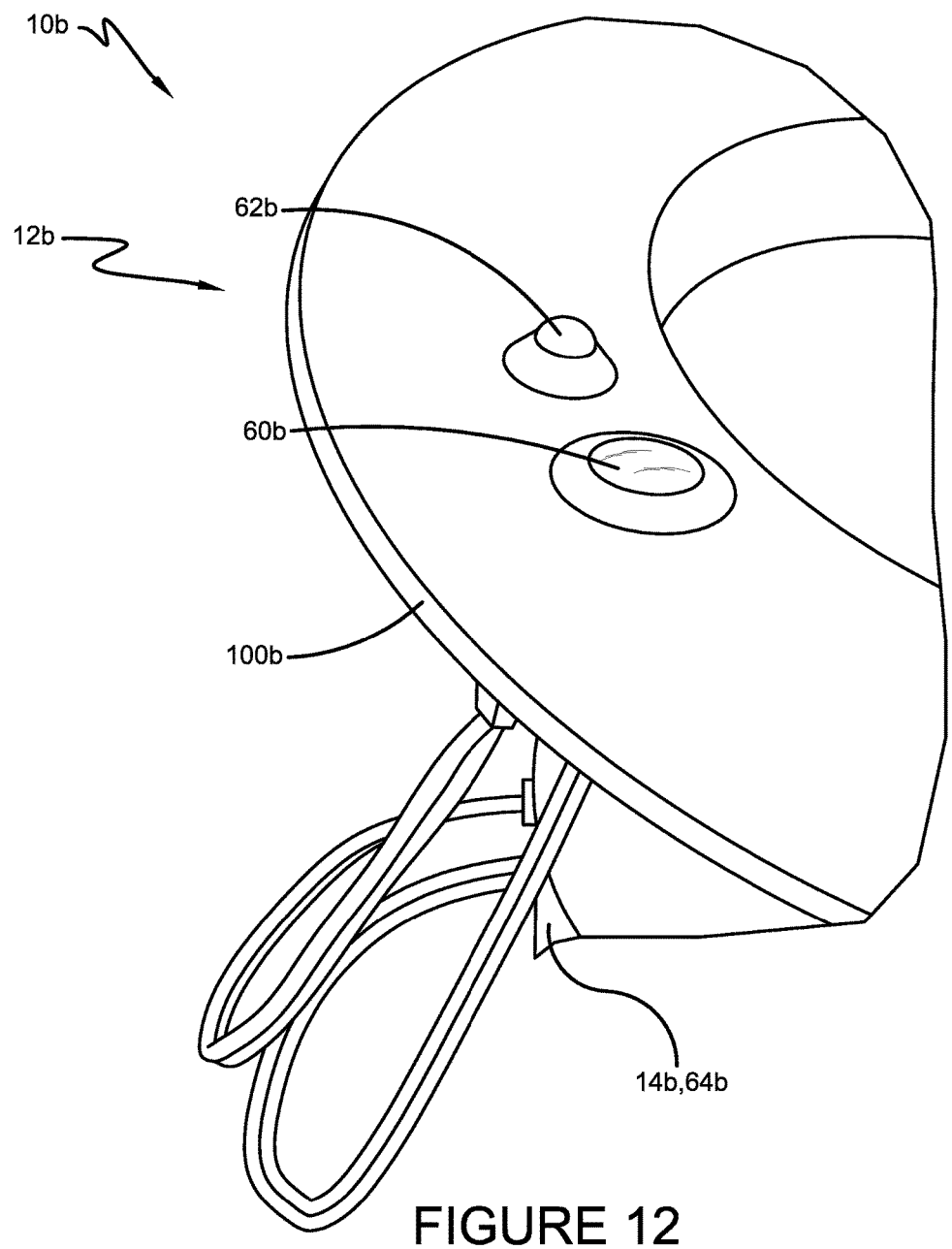
FIG. 12 is a side perspective view of the third exemplary lighting arrangement looking across a light emitter portion.

The first exemplary battery backup portion 14 is circular. FIGS. 6-8 are of a second exemplary battery backup portion 14a. The second exemplary battery backup portion 14a is square and can be exposed after installation without aesthetic concerns and mounted directly to a light emitter, similar to the first exemplary battery backup portion 14. The second exemplary battery backup portion 14a can be utilized with a wall sconce. The second exemplary battery backup portion 14a can include a case 64a. A converter portion 42a and a battery portion 44a can be positioned in the case 64a. The exemplary converter portion 42a is shown as a subcase 66a; the circuitry of the converter portion 42a is disposed within the subcase 66a. The schematic of FIG. 5 is applicable to the lighting arrangement 10a.

The exemplary battery portion 44a includes batteries 68a, 70a, 72a. The second exemplary battery backup portion 14a can also include a plug 74a for interconnecting electronically with a light emitter portion (not shown), a plug 76a for interconnecting electronically with a test LED such as LED 62 (not shown), and a plug 78a for interconnecting electronically with a test button such as test button 60 (not shown). Apertures are defined in the exemplary case 64a for receiving mating plugs. It is noted that wiring among the various components is not shown to enhance the clarity of the other structures, but the batteries 68a, 70a, 72a, the converter portion 42a, and the plugs 74a, 76a, 78a are electronically connected with one another through wiring.

The second exemplary battery backup portion 14a can also include a cover 80a to enclose the converter portion 42a and the plugs 74a, 76a, 78a in the case 64a. The second exemplary battery backup portion 14a can also include a door 82a. The door 82a can be selectively opened and closed with a clip 84a. When the door 82a is closed, the batteries 68a, 70a, 72a are enclosed in the case 64a. The cover 80a and door 82a can include one or more apertures such as apertures 86a, 88a, 90a for receiving mounting hardware projecting from a wall. The case 64a can include apertures such as apertures 92a, 94a for receiving tabs associated with a light emitter to hang the light emitter on the case 64a.

FIGS. 9-12 are of an embodiment of the present disclosure that is a recessed lighting arrangement 10b. The lighting arrangement 10b includes a light emitter portion 12b having a plurality of light emitting diodes and circuitry for driving the plurality of light emitting diodes including a rectifier and an IC chip downstream of the rectifier. The lighting arrangement 10b also includes a battery backup portion 14b in electronic communication with the light emitter portion 12b and having a battery portion with one or more batteries and a converter portion with a DC-AC inverter downstream of the one or more batteries that directs the electrical signal to the rectifier and is driven by the one or batteries. The schematic of FIG. 5 is applicable to the lighting arrangement 10b.

The third exemplary battery backup portion 14b is generally cubic and can be mounted directly to the light emitter 12b, similar to the first and second exemplary battery backup portions 14, 14a. The third exemplary battery backup portion 14b can include a case 64b. The exemplary case 64b extends from a bottom edge 96b to a top edge 98b. A converter portion 42b and a battery portion 44b can be positioned in the case 64b. The exemplary converter portion 42b is shown as a subcase 66b, as best shown in FIG. 11. The circuitry of the converter portion 42b is disposed within the subcase 66b. The schematic of FIG. 5 is applicable to the lighting arrangement 10b.

The exemplary battery portion 44b includes batteries 68b, 70b. The third exemplary battery backup portion 14b can also include a plug 74b for interconnecting electronically with the light emitter portion 12b, a plug 76b for interconnecting electronically with a test LED 62b, and a plug 78b for interconnecting electronically with a test button 60b. The light emitting diode 62b and the test button 60b are mounted in a flange portion 100b of the light emitter portion 12b. Apertures are defined in the exemplary case 64b for receiving mating plugs. It is noted that wiring among the various components is not shown to enhance the clarity of the other structures, but the batteries 68b, 70b, the converter portion 42b, and the plugs 74b, 76b, 78b are electronically connected with one another through wiring.

The third exemplary battery backup portion 14b can also include a door 82b to enclose the converter portion 42b, the plugs 74b, 76b, 78b, and the battery portion 44b in the case 64b. The door 82b can be selectively opened and closed with a clip 84b. When the door 82b is closed, the batteries 68b, 70b are enclosed in the case 64b. The lighting arrangement 10b can also include fins/springs 102b, 104b, 106b for mounting the lighting arrangement 10b in a hole in a ceiling.

FIGS. 13-16 are of an embodiment of the present disclosure that is a lighting arrangement 10c that can be mounted on a surface exposed in a dwelling space, such as a ceiling or a wall. The lighting arrangement 10c includes a light emitter portion 12c having a plurality of light emitting diodes 108c and circuitry (referenced generally at 110c) for driving the plurality of light emitting diodes 108c including a rectifier and an IC chip downstream of the rectifier. The lighting arrangement 10c also includes a battery backup portion 14c in electronic communication with the light emitter portion 12c and having a battery portion with one or more batteries and a converter portion with a DC-AC inverter downstream of the one or more batteries that directs the electrical signal to the rectifier and is driven by the one or batteries. The schematic of FIG. 5 is applicable to the lighting arrangement 10c.

Figure 16:
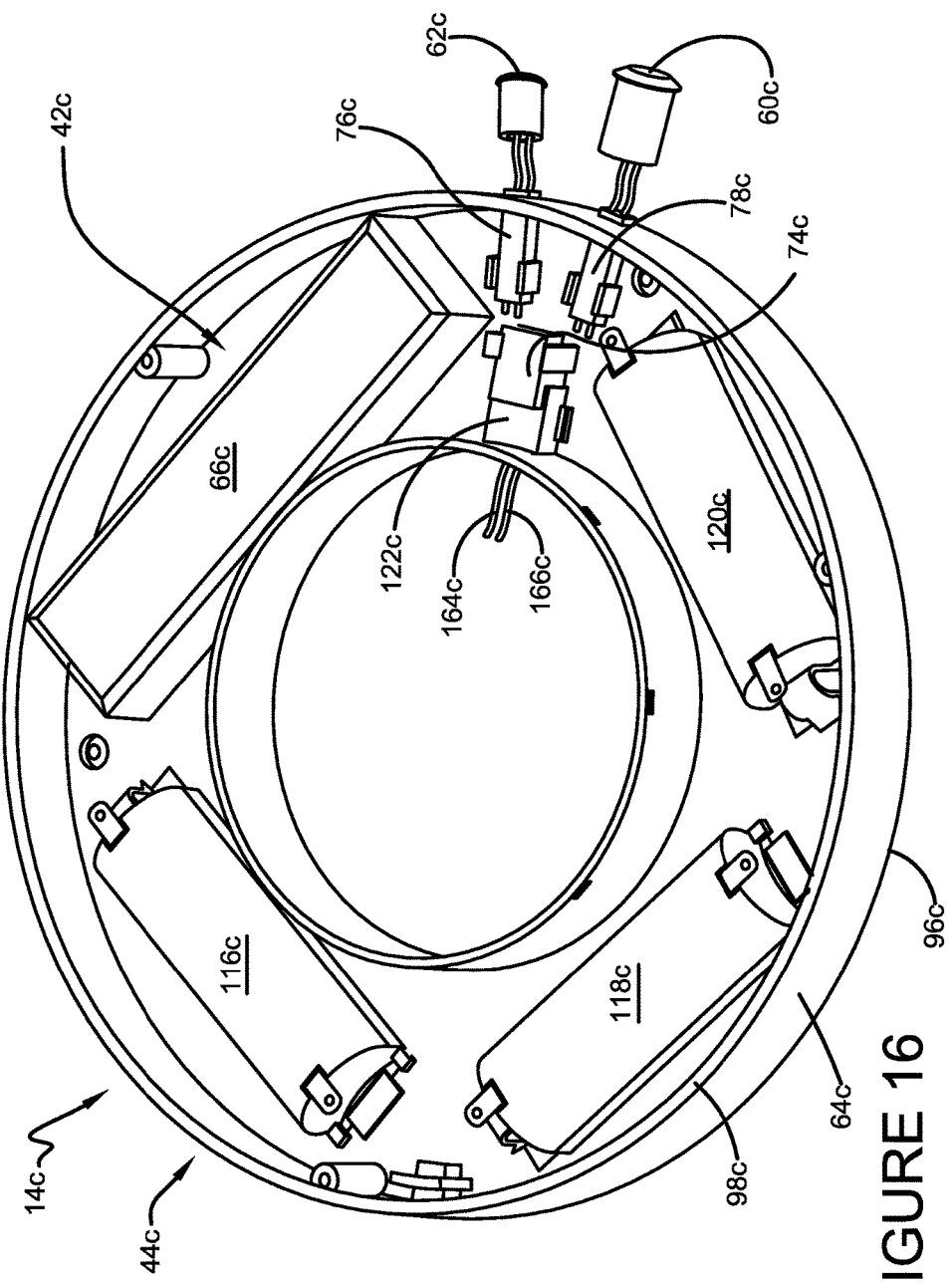
FIG. 16 is a perspective view from a top perspective looking downward of a battery backup portion of the fourth exemplary lighting arrangement with a top wall removed to show internal structures.
Figure 17:
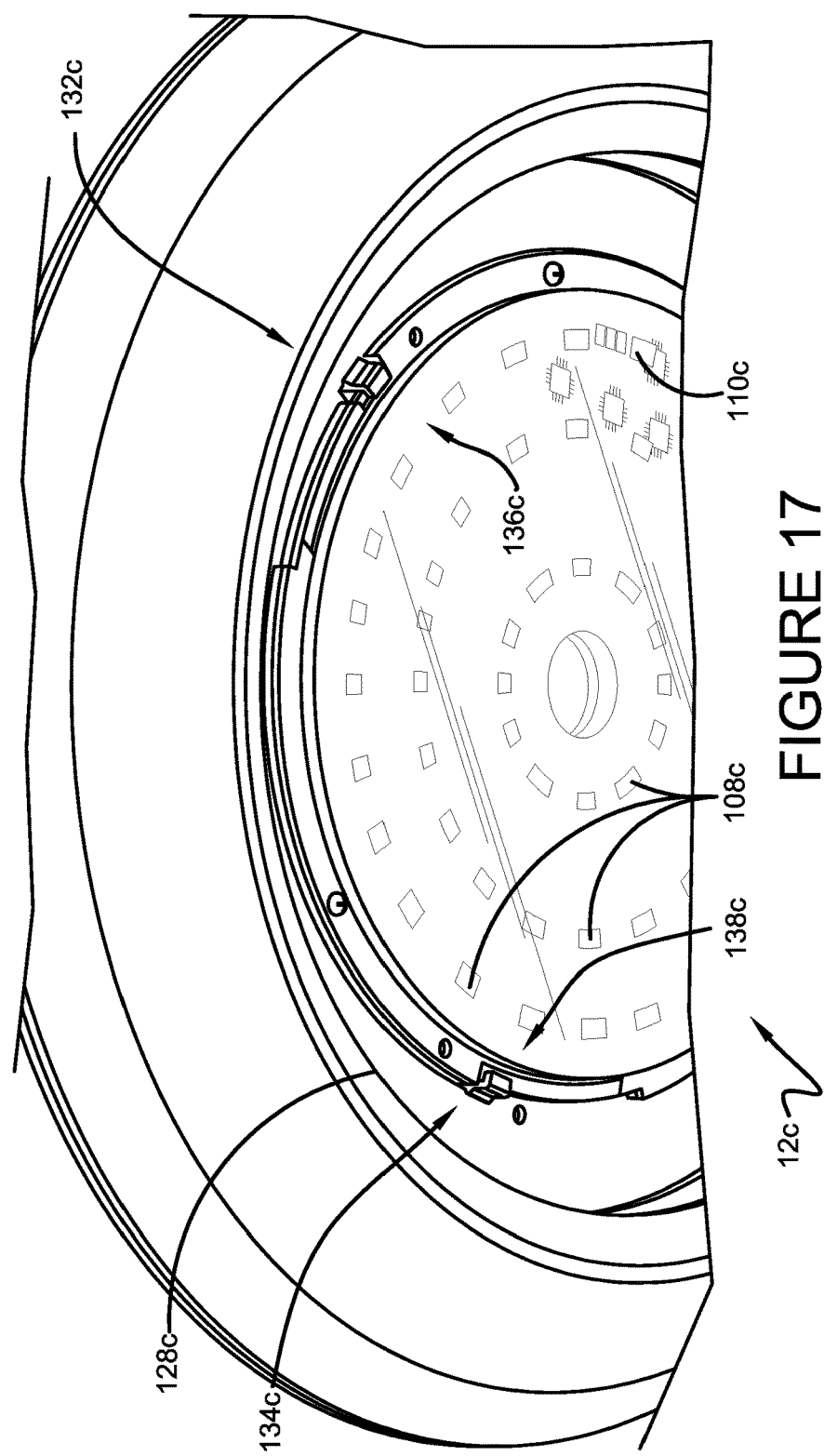
FIG. 17 is a magnified portion of FIG. 14.

The light emitter portion 12c and the battery backup portion 14c are centered on a longitudinal axis 112c. The third exemplary battery backup portion 14c is generally ring or donut-shaped. The third exemplary battery backup portion 14c can include a case 64c. The exemplary case 64c extends from a bottom edge 96c to a top edge 98c and can include a top wall 114c. A converter portion 42c and a battery portion 44c can be positioned in the case 64c. The exemplary converter portion 42c is shown as a subcase 66c, as best shown in FIG. 16. The circuitry of the converter portion 42c is disposed within the subcase 66c. The schematic of FIG. 5 is applicable to the lighting arrangement 10c.

The exemplary battery portion 44c includes batteries. In FIG. 16, the case 64c is shown having pockets 116c, 118c, 120c for receiving batteries. The perspective of FIG. 16 is from the top of the battery backup portion 14c, looking down. The openings of the pockets 116c, 118c, 120c for receiving the batteries is on the underside of the case 64c and therefore not visible in FIG. 16. The third exemplary battery backup portion 14c can also include a plug 74c for interconnecting electronically with the light emitter portion 12c. A plug from the light emitter 12c is referenced at 122c. The third exemplary battery backup portion 14c can also include a plug 76c for interconnecting electronically with a test LED 62c. The third exemplary battery backup portion 14c can also include a plug 78c for interconnecting electronically with a test button 60c. Apertures are defined in the exemplary case 64c for permitting passage of the plugs 76c, 78c. It is noted that wiring among the various components is not shown to enhance the clarity of the other structures, but the batteries, the converter portion 42c, and the plugs 74c, 76c, 78c are electronically connected with one another through wiring.

The fourth exemplary battery backup portion 14c can also include doors 82c, 124c, 126c to enclose the pockets 116c, 118c, 120c that receive the batteries. Each door 82c, 124c, 126c can be selectively opened and closed with a respective clip, such as clip 84c of door 82c. When the doors 82c, 124c, 126c are closed, the batteries are enclosed in the case 64c.

The lighting arrangement 10c further comprises a pan or trim 128c at least partially positioned between the light emitter portion 12c and the battery backup portion 14c along the longitudinal axis 112c. The electronic communication between the light emitter portion 12c and the battery backup portion 14c occurs through wires extending through an aperture 162c in the trim 128c, such as wires referenced at 164c, 166c. The trim 128c extends radially beyond the light emitter portion 12c relative to the longitudinal axis 112c and is configured to shield the battery backup portion 14c from light emitted by the light emitter portion 12c. The trim 128c can be mounted to a junction box or to the ceiling or wall, directly or with a bracket. The battery backup portion 14c can be mounted to the light emitter 12c through the trim 128c, as will be described in greater detail below. The light emitting diode 62c and the test button 60c can be mounted in a flange portion 130c of the trim 128c. The trim 128c includes apertures, such as apertures 158c, 160c, aligned with the doors 124c, 126c such that the doors 124c, 126c are exposed through the apertures 158c, 160c, allowing the batteries to be replaced without removing the trim 128c from the ceiling or wall. It is noted that the trim 128c can include an aperture aligned with door 82c as well.

Figure 18:
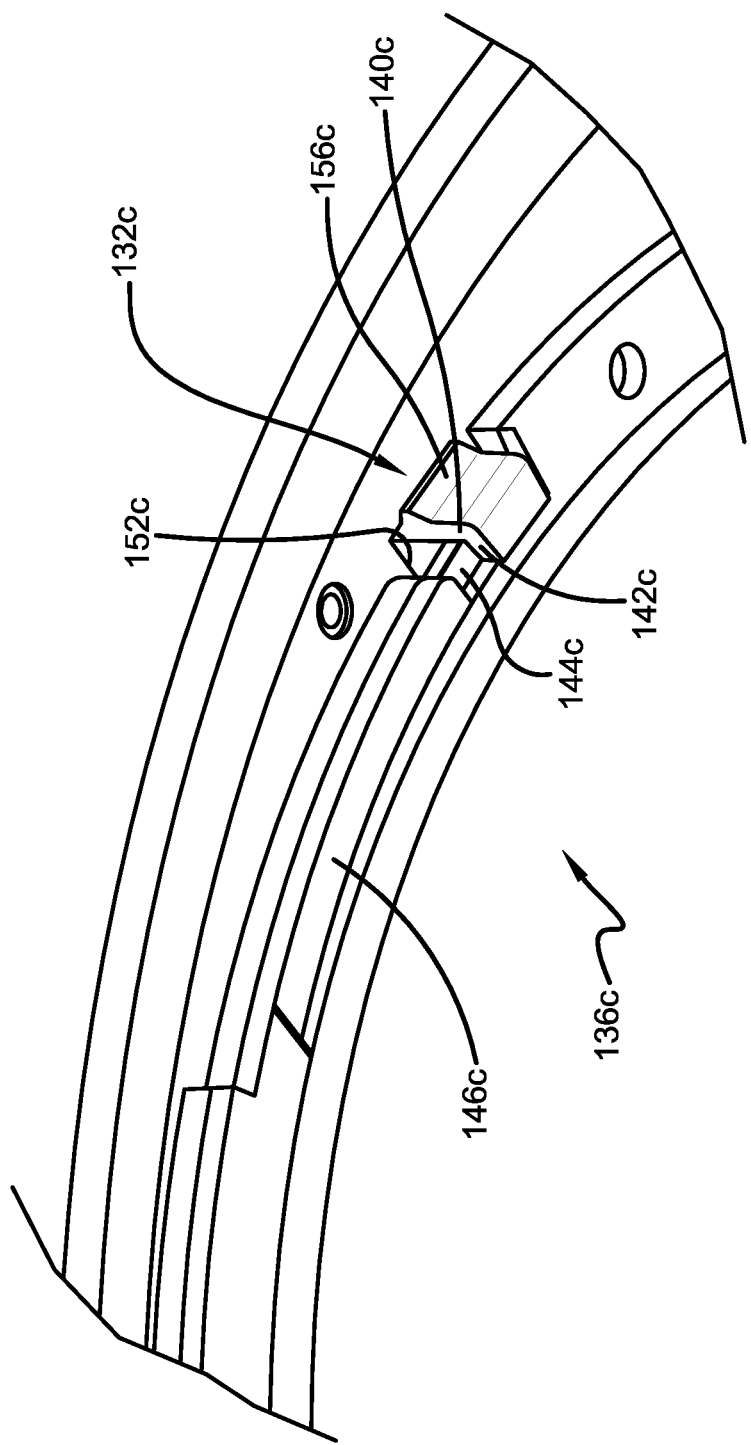
FIG. 18 is a magnified portion of FIG. 17.
Figure 19:
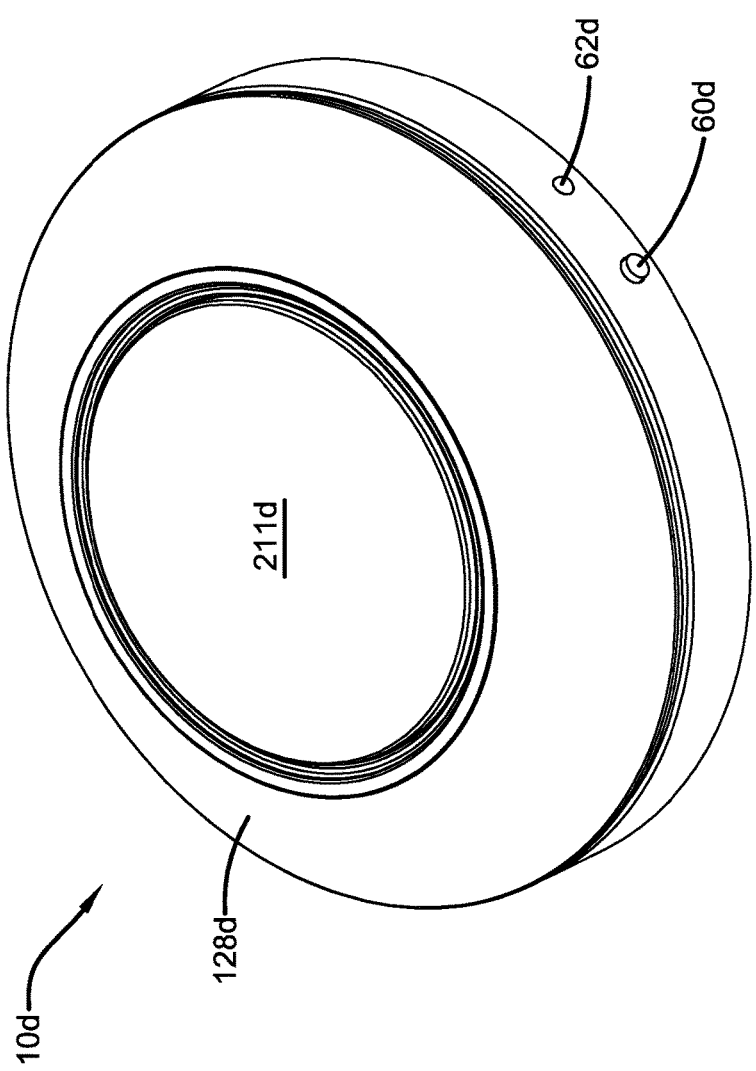
FIG. 19 is a perspective view of a fifth exemplary embodiment according to one or more implementations of the present disclosure.
Figure 20:
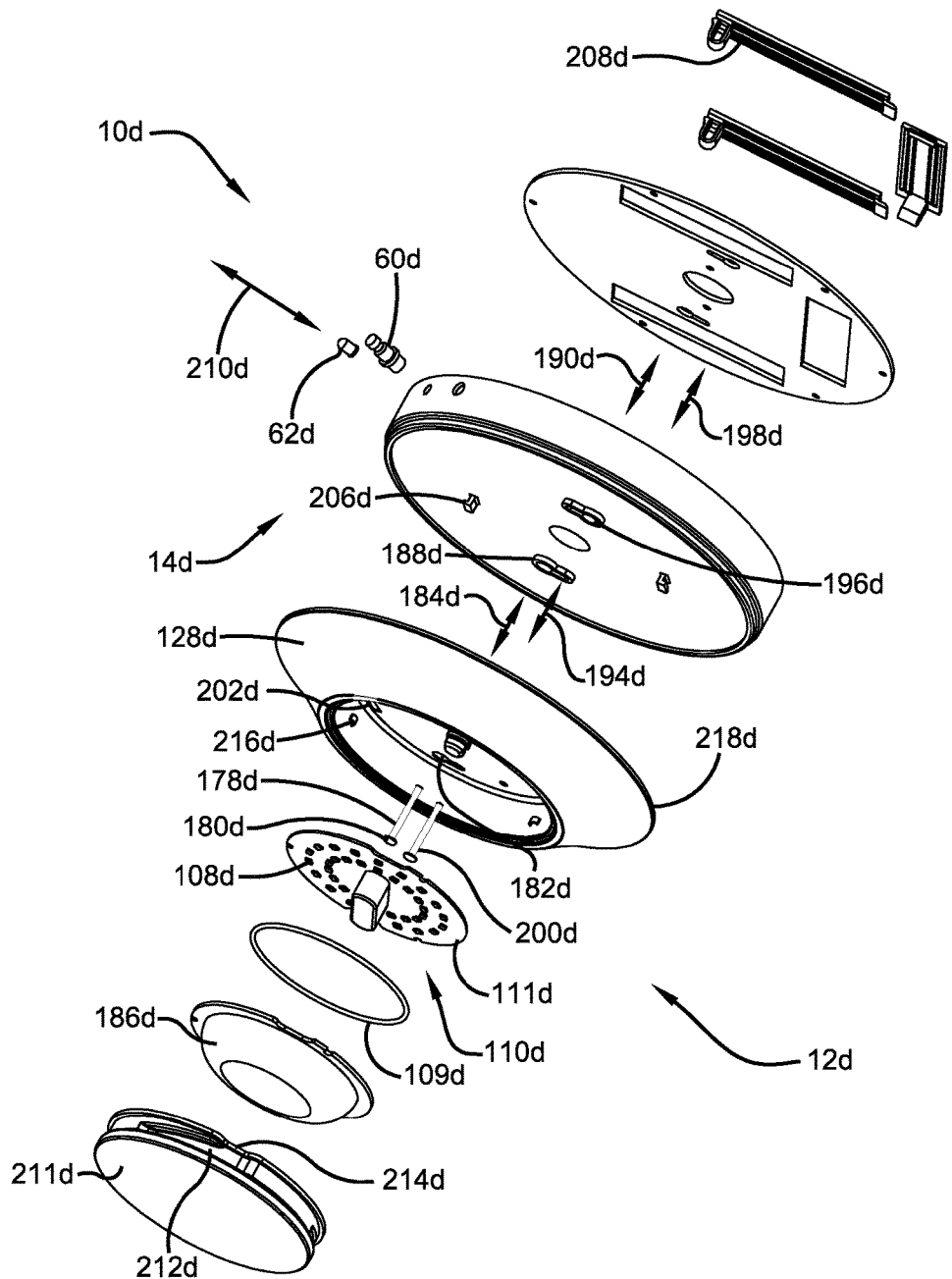
FIG. 20 is an exploded view of the fifth exemplary embodiment.
Figure 21:
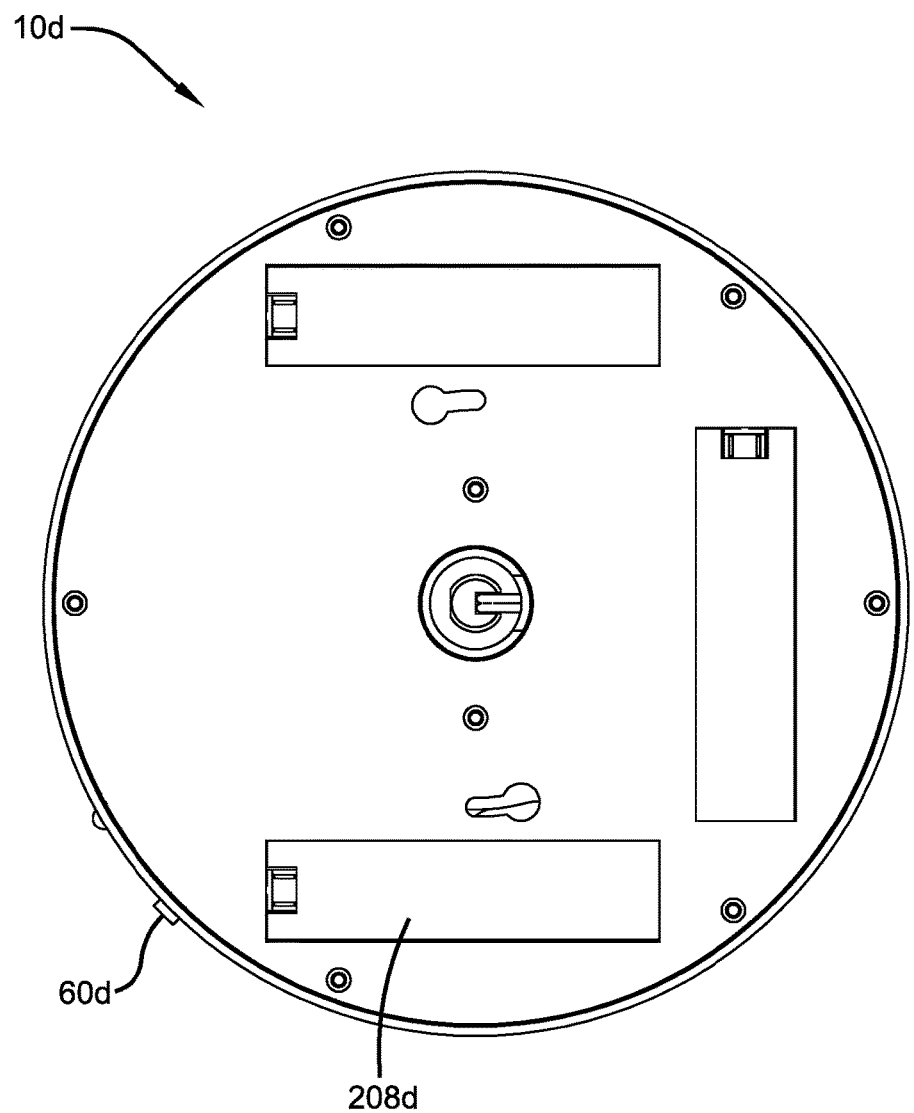
FIG. 21 is a top view of the fifth exemplary embodiment.
Figure 22:
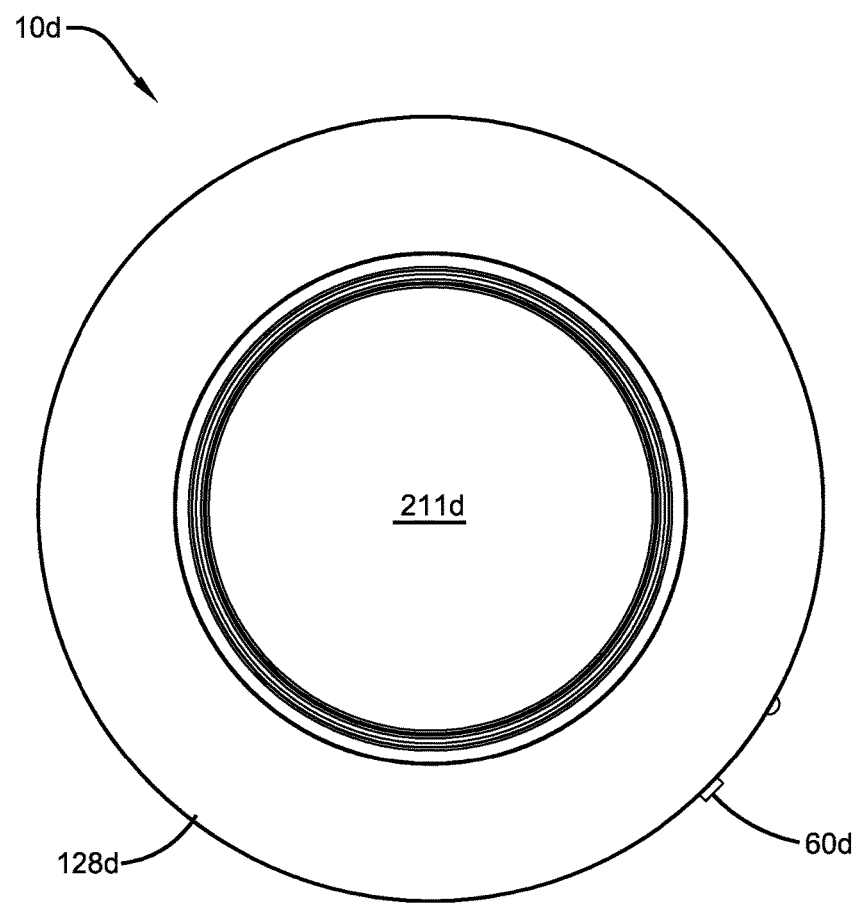
FIG. 22 is a bottom view of the fifth exemplary embodiment.
Figure 23:
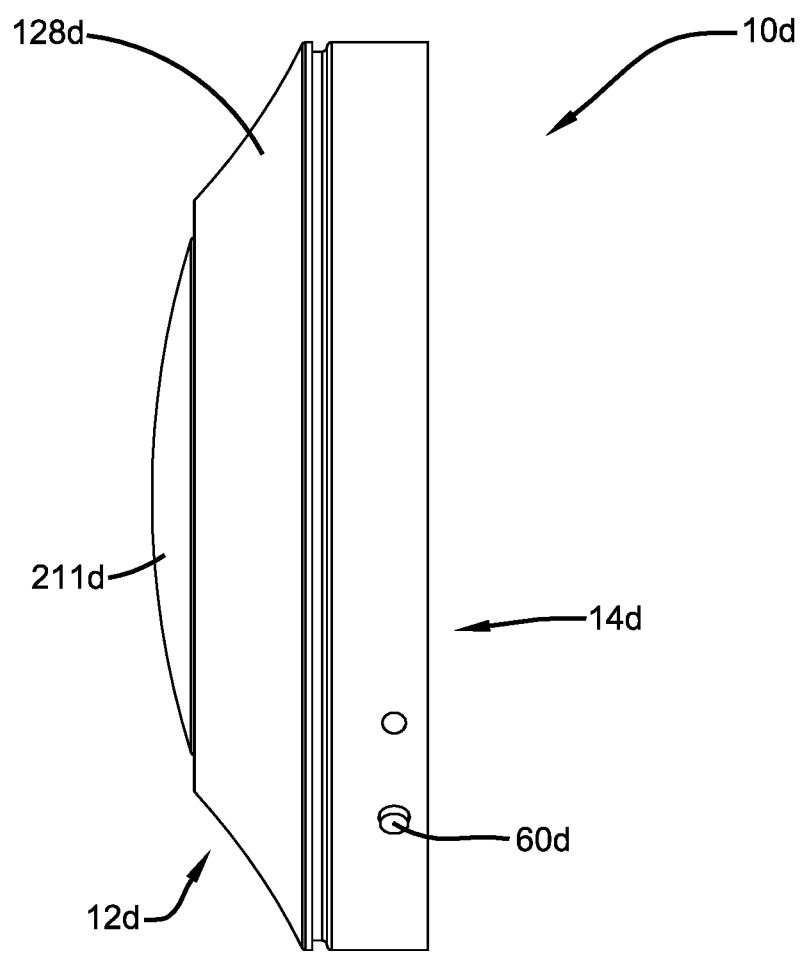
FIG. 23 is a side view of the fifth exemplary embodiment.
Figure 24:
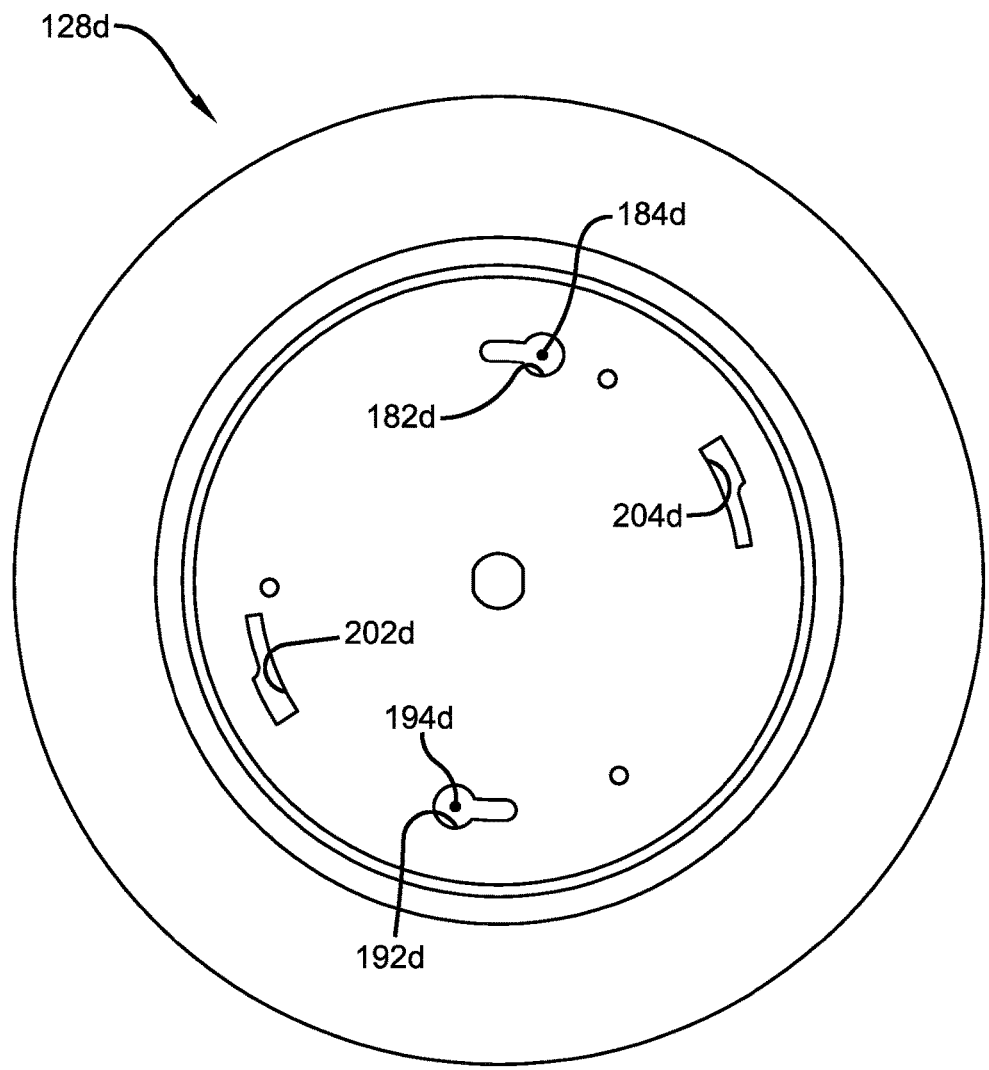
FIG. 24 is a bottom view of a trim of the fifth exemplary embodiment.
Figure 25:
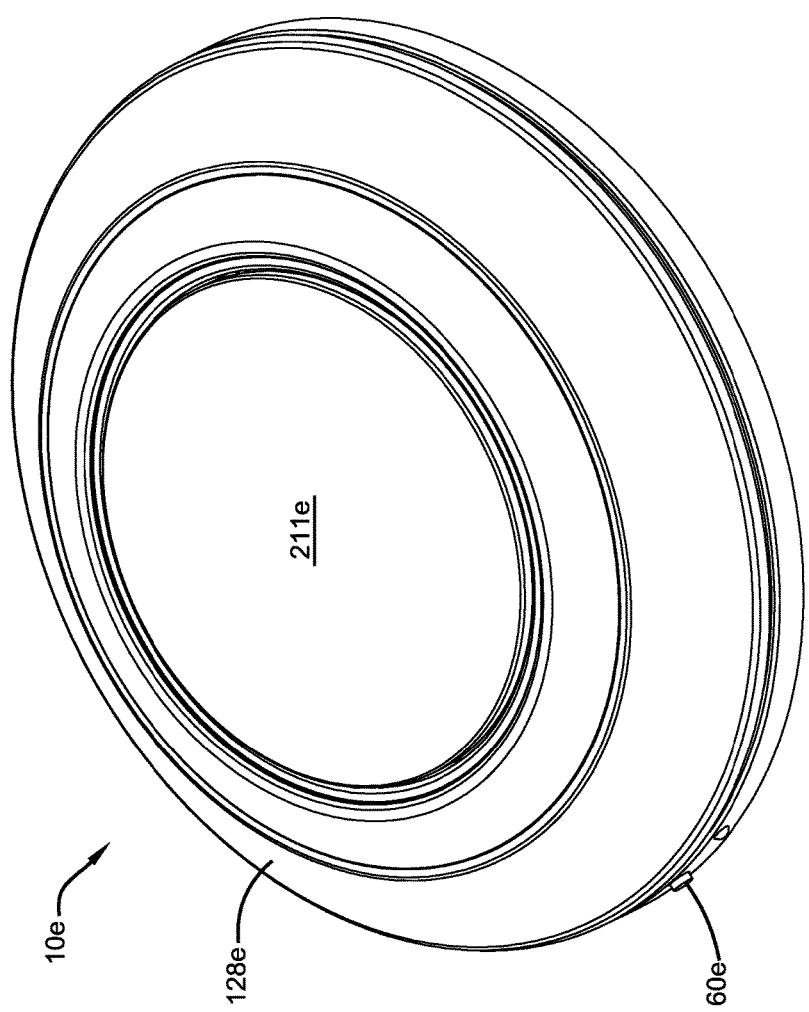
FIG. 25 is a perspective view of a sixth exemplary embodiment according to one or more implementations of the present disclosure.
Figure 26:
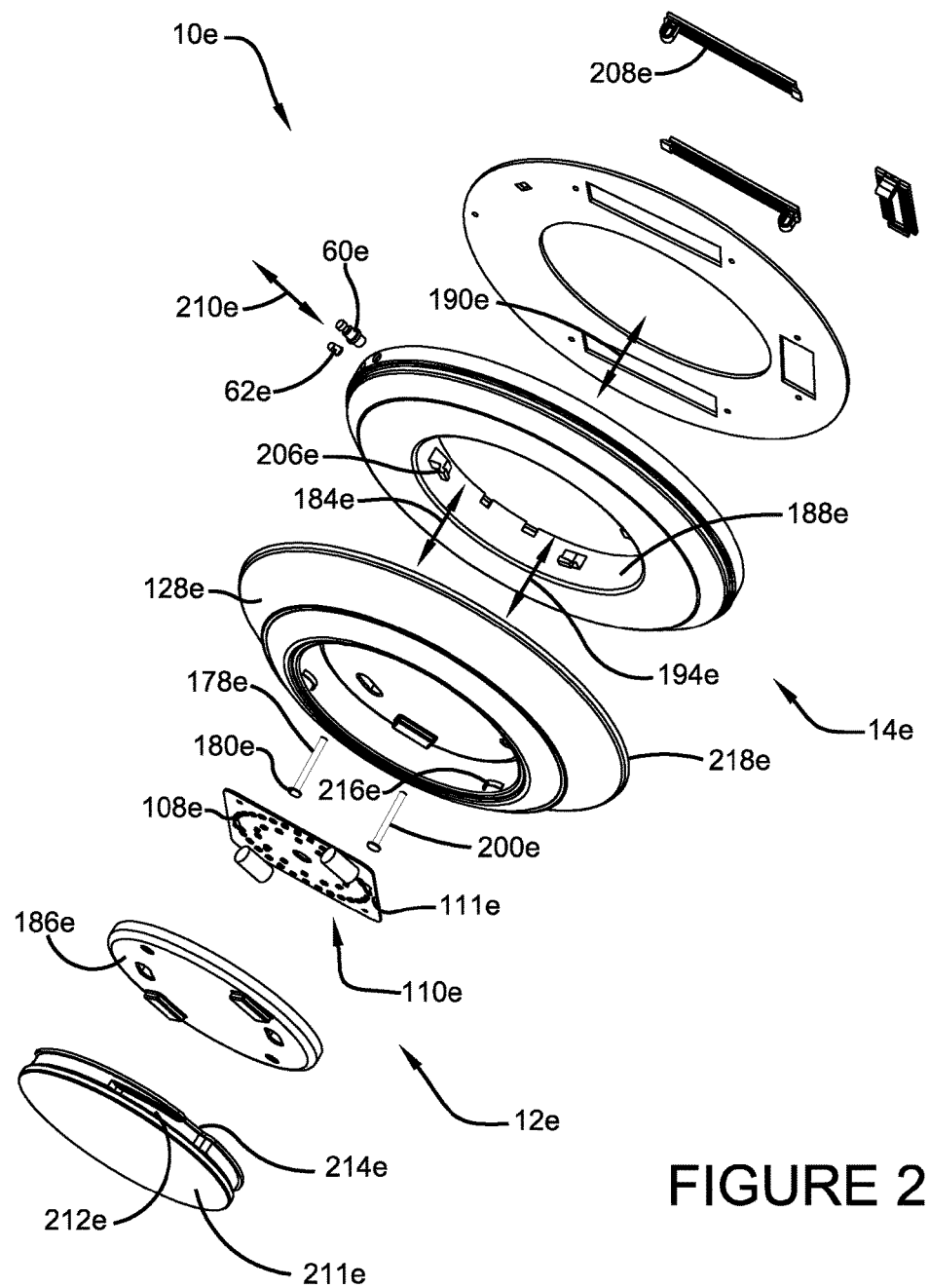
FIG. 26 is an exploded view of the sixth exemplary embodiment.
Figure 27:
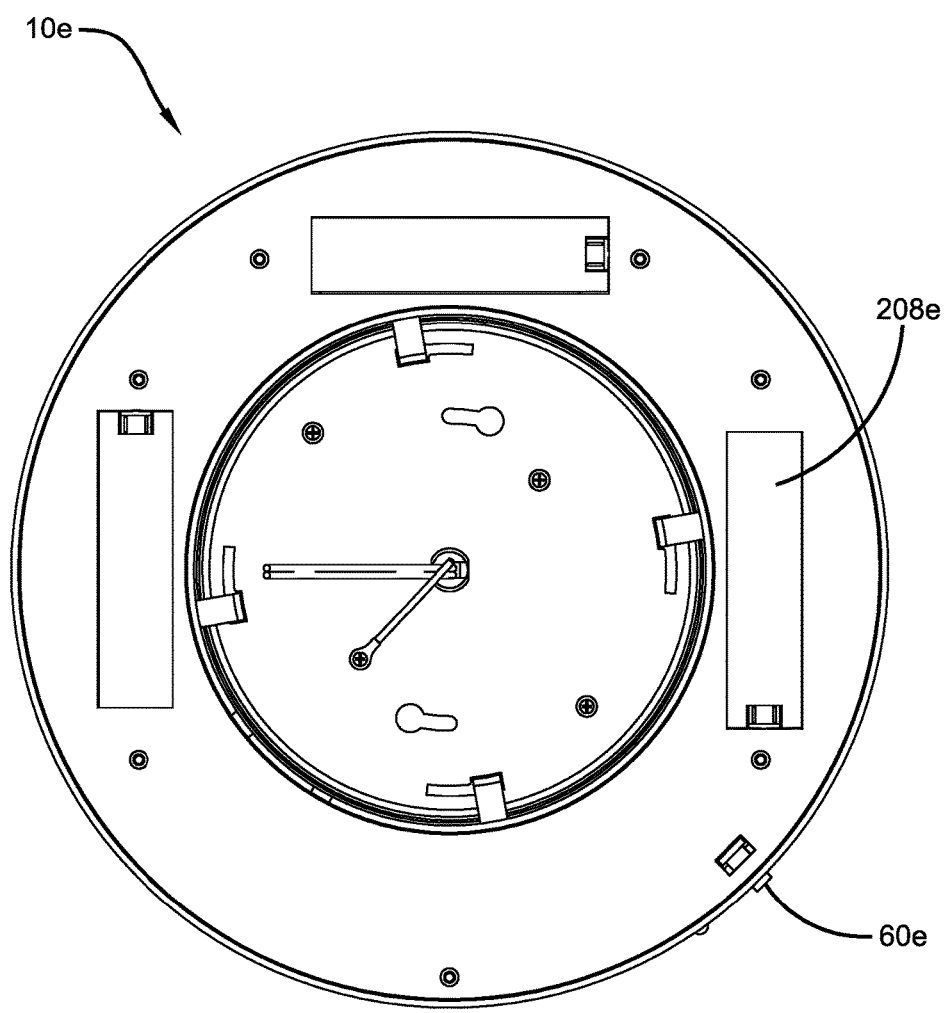
FIG. 27 is a top view of the sixth exemplary embodiment.
Figure 28:
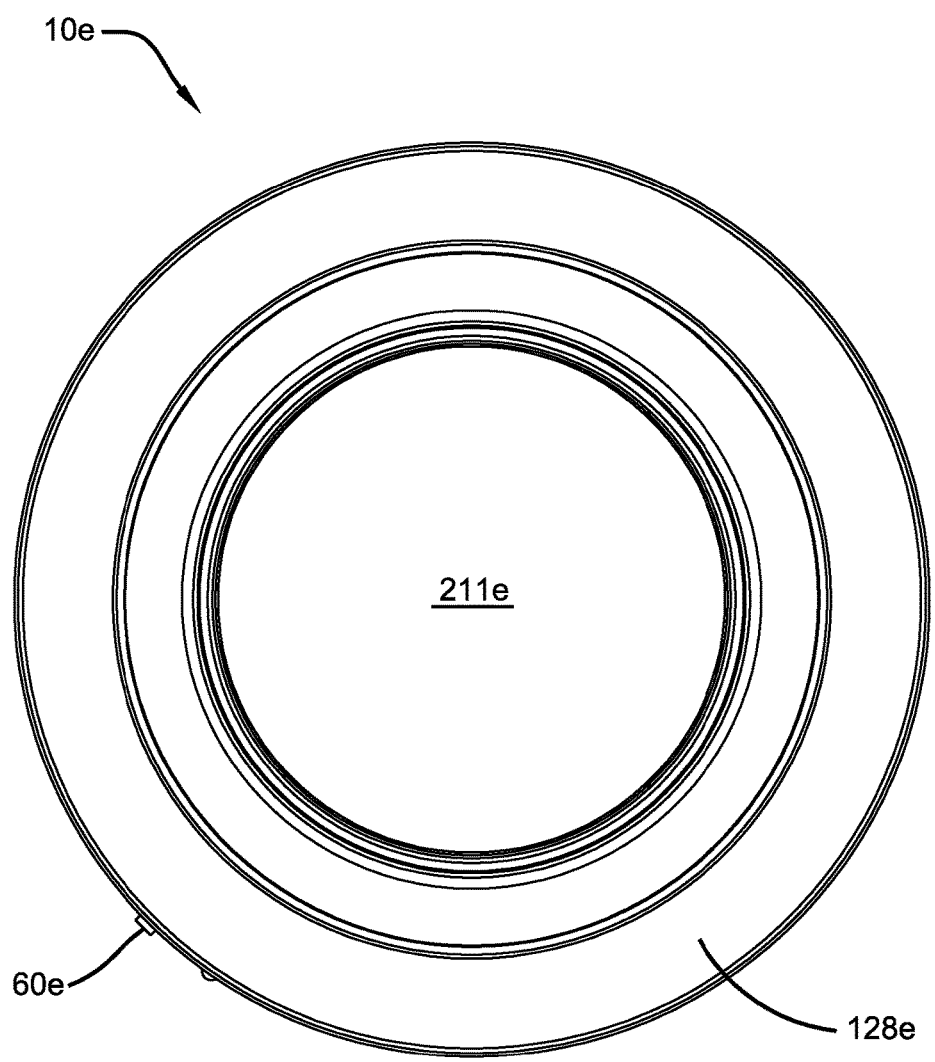
FIG. 28 is a bottom view of the sixth exemplary embodiment.
Figure 29:
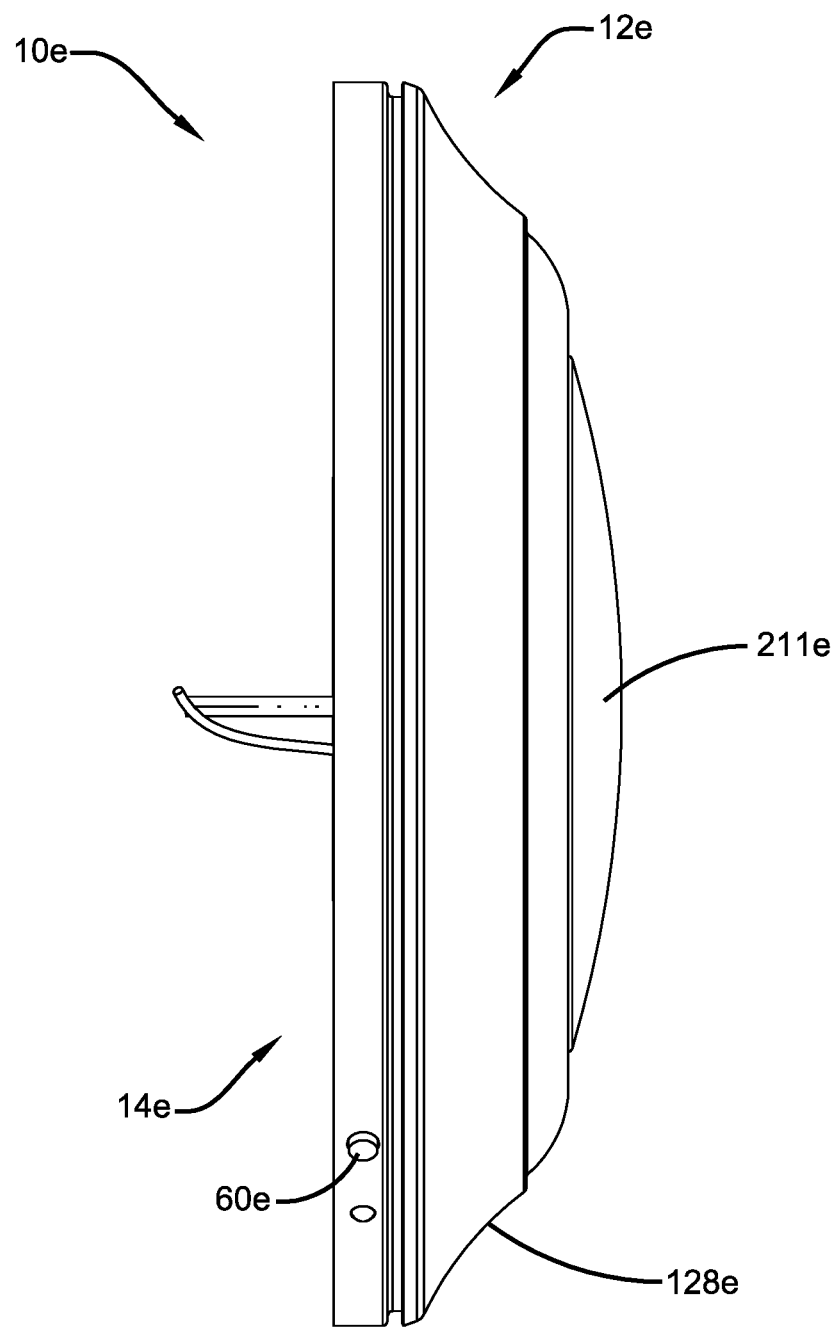
FIG. 29 is a side view of the sixth exemplary embodiment.
Figure 30:
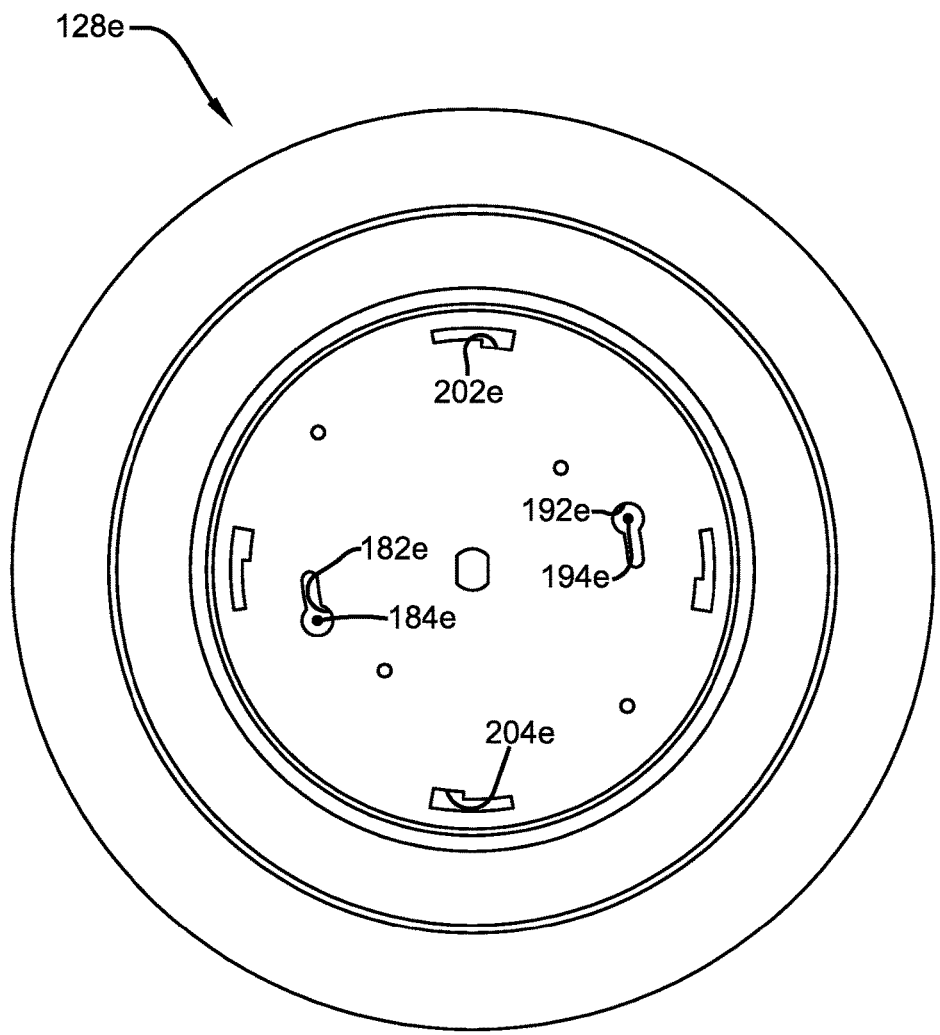
FIG. 30 is a perspective, generally-bottom view of a trim of the sixth exemplary embodiment.

The lighting arrangement 10 also includes a plurality of locking arms such as locking arms 132c, 134c and a plurality of circumferential notches such as circumferential notches 136c, 138c. The plurality of locking arms 132c, 134c can each be fixedly associated with the battery backup portion 14c. Each of the plurality of locking arms 132c, 134c can include an axial portion extending along the longitudinal axis 112c and a radial portion extending perpendicular to the longitudinal axis 112c. In FIG. 18, the exemplary locking arm 132c includes an axial portion 140c and a radial portion 142c. Each of the radial portions extends from a first end at an intersection with one of the axial portions to a respective second end distal relative to the first end.

Figure 13:
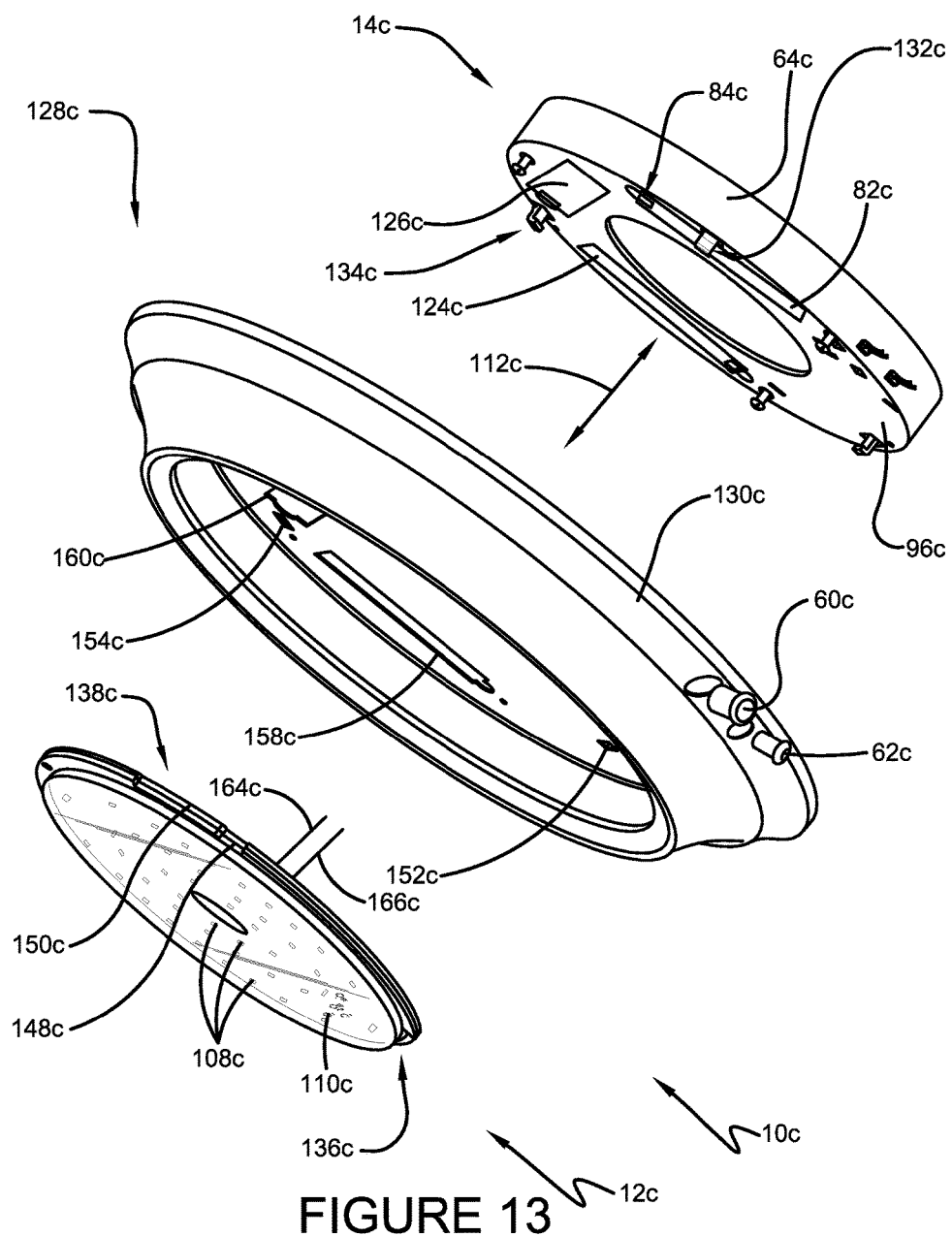
FIG. 13 is an exploded view of a fourth exemplary lighting arrangement according to one or more implementations of the present disclosure.
Figure 14:
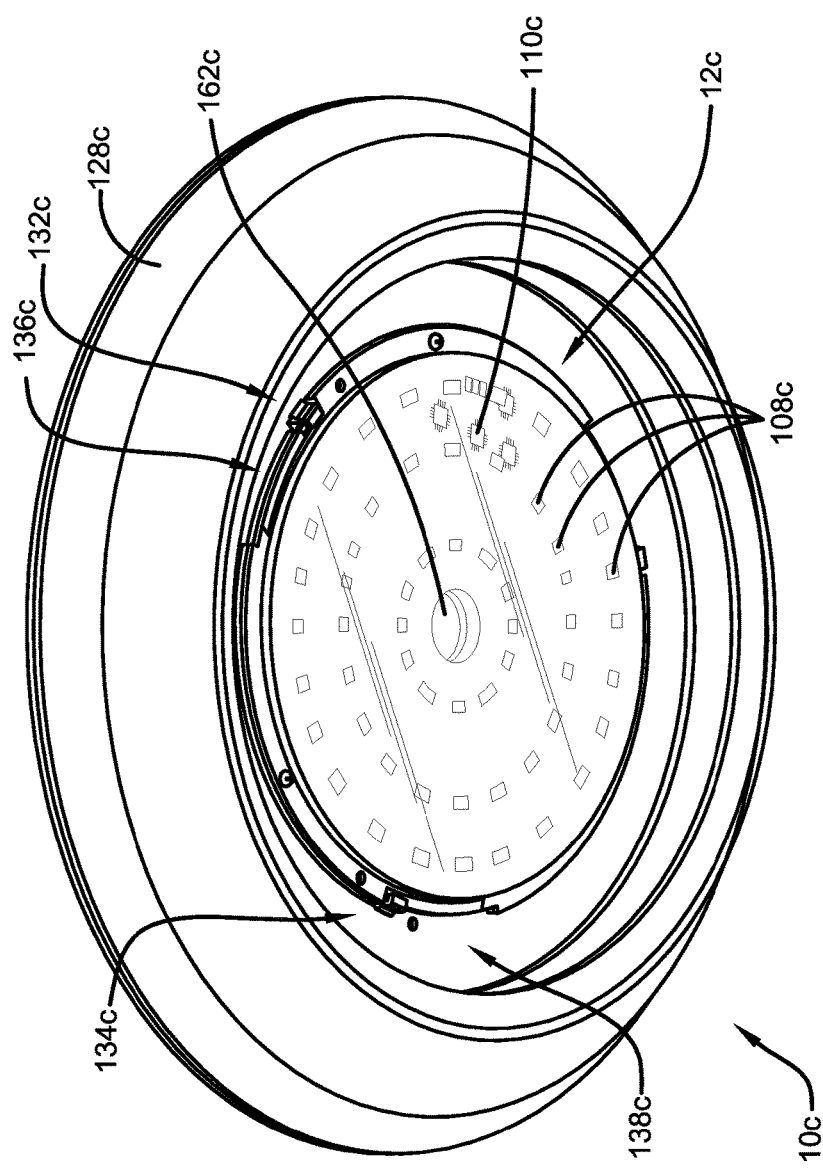
FIG. 14 is a perspective view from a bottom perspective looking upward of the fourth exemplary lighting arrangement.
Figure 15:
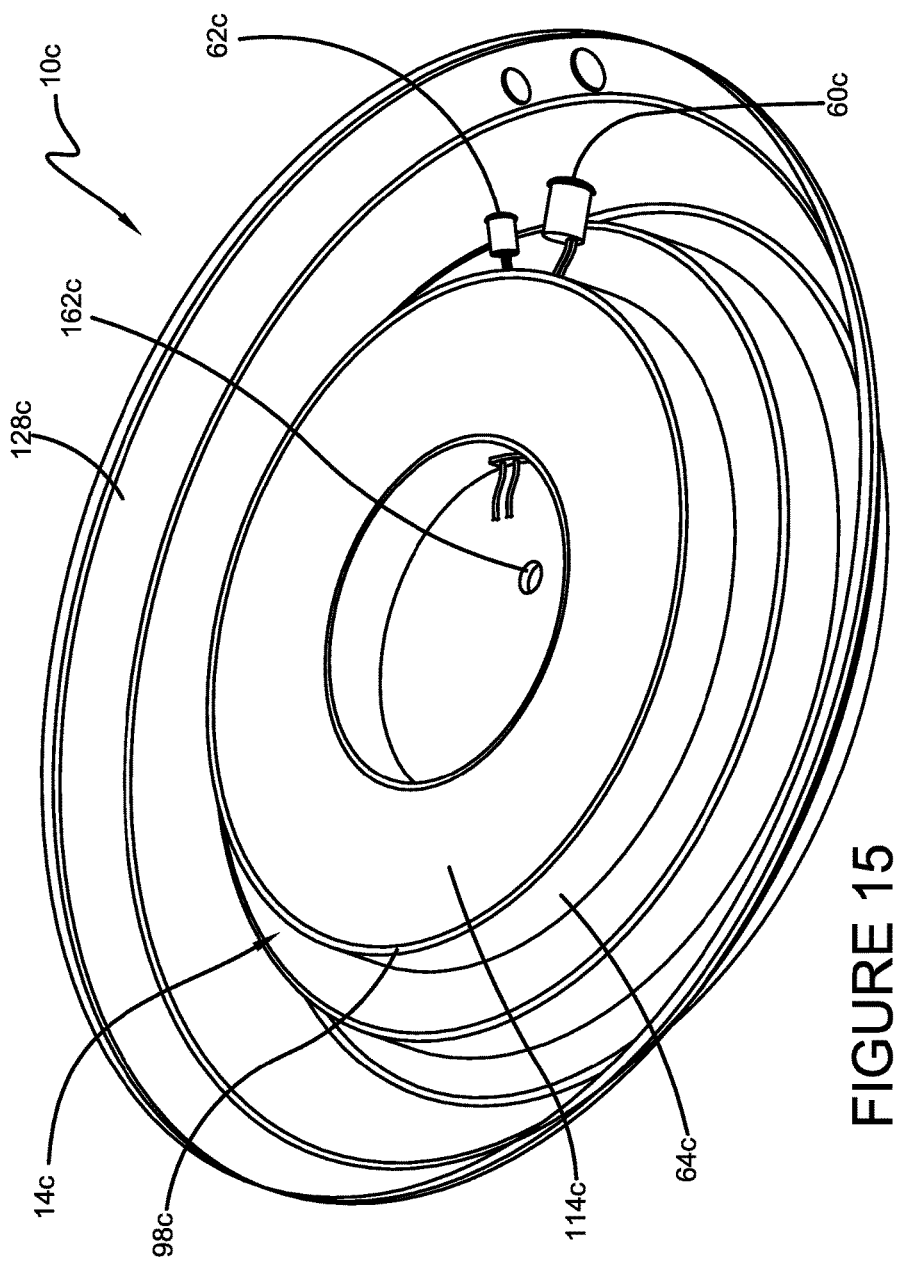
FIG. 15 is a perspective view from a top perspective looking downward of the fourth exemplary lighting arrangement.

Each of the plurality of exemplary circumferential notches 136c, 138c is defined in the light emitter portion 12c. Each of the plurality of circumferential notches 136c, 138c extends about the longitudinal axis 112c and defines a gap portion and a ledge portion. In FIG. 18, the exemplary circumferential notch 136c includes a gap portion 144c and a radial portion 146c. In FIG. 13, the exemplary circumferential notch 138c includes a gap portion 148c and a radial portion 150c.

The battery backup portion 14c and the trim 128c can be interconnected by passing the locking arms 132c, 134c through apertures in the trim 128c, such as apertures 152c, 154c. The apertures 152c, 154c can be sized to prevent movement of the plurality of locking arms 132c, 134c about the longitudinal axis 112c. 11. The plurality of locking arms 132c, 134c can engage at least some of the apertures 152c, 154c of the trim 128c through a snap-lock connection wherein the plurality of locking arms 132c, 134c elastically deform during passage through the apertures 152c, 154c of the trim 128c and recover after passage through the apertures 152c, 154c of the trim 128c. As best shown in FIG. 18, the locking arm 132c can include a radially-outer facing ramp 156c than rides along the aperture 152c and elastically deforms, and then snaps back to lock against the aperture 152c.

After the battery backup portion 14c has been engaged with the trim 128c, the light emitter portion 12c and the battery backup portion 14c can be interconnected by moving each of the plurality of radial portions through one of the plurality of gap portions along the longitudinal axis 112c and then rotating the light emitter portion 12c and the battery backup portion 14c relative to one another in a first angular direction about the longitudinal axis 112c and sliding each of the plurality of radial portions under the ledge portions. The ledge portions can rest on the radial portions.

Referring now to FIGS. 19-24, a lighting arrangement 10d can include a light emitter portion 12d and a battery backup portion 14d. The light emitter portion 12d can have a plurality of LEDs 108d in an array string and circuitry 110d for driving the plurality of LEDs 108d. It is noted that numerous LEDs are shown but not all LEDs are referenced with the number 108d. The exemplary circuitry 110d is embedded in a circuit board 111d.

The circuitry 110d can include a rectifier and an IC chip configured to drive the plurality of LEDs 108d, with the rectified voltage provided by the rectifier. The light emitter portion 12d can also have a trim 128d. The plurality of LEDs 108d in the array string and the circuitry 110d can be mounted on the trim 128d.

The battery backup portion 14d can be in selectively engageable electronic communication with the rectifier of the light emitter portion 12d and have a battery portion with one or more batteries and a converter portion with a DC-AC inverter. The converter portion can be connected to the rectifier and can be configured to receive power from the one or more batteries or a primary AC source. The converter portion can includes a microcontroller unit configured to route AC power to the rectifier from either the primary AC source or the battery portion when said light emitter portion 12d and said battery backup portion 14d are engaged with one another.

The schematic of FIG. 5 is applicable to the lighting arrangement 10d and can define the circuitry 110d (the right side of the Figure) and the electronic circuitry of the battery backup portion 14d (the right side of the Figure).

The light emitter portion 12d can be configured to be mounted to a junction box and positioned below a ceiling of a dwelling space during use. The battery backup portion 14d can be configured to be selectively positionable between the light emitter portion 12d and the junction box. A user can mount the light emitter portion 12d to the junction box with fasteners with or without the battery backup portion 14d. When the light emitter portion 12d and the battery backup portion 14d are engaged together, both would be positioned below the ceiling. In the exemplary embodiment, both would be at least partially visible. Thus, the exemplary the light emitter portion 12d and the battery backup portion 14d are disclosed such that the battery backup portion 14d provides a power backup while not compromising the profile of the lighting arrangement 10d on the ceiling.

The exemplary light emitter portion 12d also includes an inner lens 186d. The exemplary inner lens 186d is fixed to the circuit board 111d and encloses the LEDs 108d. A gasket 109d can be positioned between the exemplary inner lens 186d and the exemplary the circuit board 111d.

The exemplary light emitter portion 12d includes at least one mounting aperture 182d centered on a first axis 184d. The exemplary first axis 184d is transverse to the ceiling of the dwelling place when the light emitter portion 12d is engaged with the junction box. For example, the first axis 184d can be in a vertical orientation when the light emitter portion 12d is engaged with the junction box and the ceiling can be horizontal. The exemplary at least one mounting aperture 182d is defined in the trim 128d and is configured to receive a fastener 178d for interconnecting the light emitter portion 12d to the junction box. The exemplary fastener 178d passes through the trim 128d and includes a head 180d contacting the trim 128d. The exemplary fastener 178d threadingly engages the junction box.

The battery backup portion 14d includes at least one mounting aperture 188d centered on a second axis 190d. The exemplary second axis 190d is transverse to the ceiling of the dwelling place when the battery backup portion 14d is engaged with the light emitter portion 12d and the light emitter portion 12d is engaged with the junction box. The first axis 184d extends through the at least one mounting aperture 188d of the battery backup portion 14d when the battery backup portion 14d is engaged with the light emitter portion 12d and the light emitter portion 12d is engaged with the junction box. The exemplary fastener 178d also passes through the at least one mounting aperture 188d of the battery backup portion 14d.

In the fifth exemplary embodiment, the first axis 184d and the second axis 190d are collinear when the battery backup portion 14d is engaged with the light emitter portion 12d and the light emitter portion 12d is mounted to the junction box. In the fifth exemplary embodiment, a second mounting aperture 192d of the light emitter portion 12d is centered on an axis 194d. The battery backup portion 14d includes another mounting aperture 196d centered on an axis 198d. The axes 194d and 198d are collinear when the battery backup portion 14d is engaged with the light emitter portion 12d and the light emitter portion 12d is mounted to the junction box. A second fastener 200d extends through the aligned apertures 192d and 196d and threadingly engages the junction box. The exemplary mounting apertures 182d, 188d, 192d, 196d are unthreaded through-apertures. As shown in the Figures, the 182d, 188d, 192d, 196d communicate with slots so that after fasteners 178*d* and 200*d* are received, the lighting arrangement 10*d* can be rotated slightly to stiffen the interconnection with the junction box.

The light emitter portion 12*d* and the battery backup portion 14*d* can include one or more locking arms and one or more slots configured to receive the one or more locking arms. In the exemplary embodiment, the light emitter portion 12*d* includes slots 202*d* and 204*d* in the trim 128*d* and the battery backup portion 14*d* includes locking arms, such as locking arm 206*d*. The exemplary slots 202*d* and 204*d* are configured to receive the exemplary locking arms. The locking arms are received in the slots to engage the light emitter portion 12*d* and the battery backup portion 14*d* together. The locking arms are received in the slots by moving the light emitter portion 12*d* and the battery backup portion 14*d* closer to one another along the axis 184*d*.

The exemplary locking arms are positioned on a first side of the battery backup portion 14*d* that confronts the light emitter portion 12*d* when the battery backup portion 14*d* and the light emitter portion 12*d* are interconnected. The battery backup portion 14*d* further includes at least one battery compartment and at least one door selectively closing the at least one battery compartment. Battery compartments are referred to as pockets in the fourth embodiment of the present disclosure and the terms are synonymous. Pockets as shown in FIG. 16 can be incorporated in the battery backup portion 14*d*. A door in the present embodiment is referenced at 208*d*. The exemplary doors of the battery backup portion 14*d* are positioned on a second side of the battery backup portion 14*d* that is opposite the first side along the axis 184*d*. The plurality of battery compartments are positioned in spaced relation to one another about a central axis of the battery backup portion 14*d* and are positioned radially outward of the axis 184*d*.

The exemplary lighting arrangement 10*d* also includes an alerting LED 62*d* and a test button 60*d*. The exemplary test button 60*d* is in electronic communication with the battery backup portion 14*d* and configured such that pressing of the test button 60*d* places the LED 62*d* in electronic communication with the battery backup portion 14*d*. The LED 62*d* and the test button 60*d* are mounted in the battery backup portion 14*d*. The test button 60*d* and the LED 62*d* are directed outward along an axis 210*d* that extends in a first plane that is perpendicular to a second plane containing the axis 184*d*. The exemplary test button 60*d* extends past a maximum outer diameter of the trim 128*d* of the light emitter portion 12*d*.

The exemplary lighting arrangement 10*d* also includes a diffuser 211*d*. The exemplary diffuser 211*d* is selectively engageable with the trim 128*d*. The exemplary diffuser 211*d* includes slots that extend about an a central axis of the diffuser 211*d* and define a vertically-oriented opening. An exemplary slot 212*d* with an opening 214*d* is referenced in the Figures. The exemplary trim 128*d* includes protuberances to engage the slots. A protuberance 216*d* is referenced in the Figures. The diffuser 211*d* is raised with the protuberances aligned with the openings and then rotated so that the protuberance is moved along the slot. The exemplary diffuser 211*d* covers the plurality of LEDs 108*d* in the array string, the circuitry 110*d*, and the mounting apertures 182*d* and 202*d* of the light emitter portion 12*d* when engaged with the trim 128*d*.

In a first exemplary process of assembly, the diffuser 211*d* can be rotated and removed from the light emitter portion 12*d*. Wiring of the circuitry can be spliced and connected to wiring in the junction box. FIGS. 2 and 3 are incorporated here as the wiring leads from the light emitter portion 12*d* are the same as the wiring leads of the light emitter portion 12. After the wire connections are completed, the mounting apertures 182*d*, 192*d* of the light emitter portion 12*d* can be aligned with threaded apertures in the junction box. Fasteners 178*d*, 200*d* can then be inserted through mounting apertures 182*d*, 192*d* to threadingly engage the threaded apertures in the junction box. As shown in the Figures, the apertures 182*d*, 192*d* communicate with slots so that after fasteners 178*d* and 200*d* are received, the lighting arrangement 10*d* can be rotated slightly to stiffen the interconnection with the junction box. The fasteners 178*d*, 200*d* can be turned until the upper edge 218*d* of the trim 128*d* contacts the ceiling. The diffuser 211*d* can then be raised to engage the protuberances in the trim 128*d* and rotated until the protuberances engage the ends of the slots.

In a second exemplary process of assembly, the input wiring of the battery backup potion 14*d* can be spliced and connected to wiring in the junction box to connect to the primary AC source (such as the grid). In FIG. 5, the input to the battery backup portion 14*d* is referenced at 172. Next, wiring of the light emitter portion 12*d* can be spliced to the output wiring of the battery backup potion 14*d*. FIGS. 2 and 3 are incorporated here as the wiring leads from the light emitter portion 12*d* are the same as the wiring leads of the light emitter portion 12. The diffuser 211*d* can then be rotated and removed from the light emitter portion 12*d*. The battery backup portion 14*d* and the light emitter portion 12*d* can then be interconnected by inserting the locking arms (such as locking arm 206*d*) in the slots (such as slot 202*d*) and rotated relative to one another. This will align the apertures 182*d*, 192*d* with the apertures 188*d*, 196*d*. The mounting apertures 182*d*, 192*d* of the light emitter portion 12*d* can then be aligned with threaded apertures in the junction box. Fasteners 178*d*, 200*d* can then be inserted through mounting apertures 182*d*, 192*d* to threadingly engage the threaded apertures in the junction box. The fasteners 178*d*, 200*d* can be turned until the upper edge 220*d* of the battery backup portion 14*d* contacts the ceiling. The diffuser 211*d* can then be raised to engage the protuberances in the trim 128*d* and rotated until the protuberances engage the ends of the slots. Upon completion of the assembly process, the weight of the battery backup portion 14*d* rests on the trim 128*d*. Also, the light emitter portion 12*d* and the battery backup portion 14*d* have substantially the same outermost diameter, so the appearance of the lighting arrangement 10*d* does not significantly change.

It is confirmed that, if desired, the battery backup portion 14*d* can later be removed from the light emitter portion 12*d* and the light emitter portion 12*d* can be reinstalled to the junction box.

Referring now to FIGS. 25-30, a lighting arrangement 10*e* can include a light emitter portion 12*e* and a battery backup portion 14*e*. The light emitter portion 12*e* can have a plurality of LEDs 108*e* in an array string and circuitry 110*e* for driving the plurality of LEDs 108*e*. It is noted that numerous LEDs are shown but not all LEDs are referenced with the number 108*e*. The exemplary circuitry 110*e* is embedded in a circuit board 111*e*.

The circuitry 110*e* can include a rectifier and an IC chip configured to drive the plurality of LEDs 108*e*, with the rectified voltage provided by the rectifier. The light emitter portion 12*e* can also have a trim 128*e*. The plurality of LEDs 108*e* in the array string and the circuitry 110*e* can be mounted on the trim 128*e*.

The battery backup portion 14*e* can be in selectively engageable electronic communication with the rectifier of the light emitter portion 12*e* and have a battery portion with one or more batteries and a converter portion with a DC-AC inverter. The converter portion can be connected to the rectifier and can be configured to receive power from the one or more batteries or a primary AC source. The converter portion can includes a microcontroller unit configured to route AC power to the rectifier from either the primary AC source or the battery portion when said light emitter portion 12e and said battery backup portion 14e are engaged with one another.

The schematic of FIG. 5 is applicable to the lighting arrangement 10e and can define the circuitry 110e (the right side of the Figure) and the electronic circuitry of the battery backup portion 14e (the right side of the Figure).

The light emitter portion 12e can be configured to be mounted to a junction box and positioned below a ceiling of a dwelling space during use. The battery backup portion 14e can be configured to be selectively positionable between the light emitter portion 12e and the junction box. A user can mount the light emitter portion 12e to the junction box with fasteners with or without the battery backup portion 14e. When the light emitter portion 12e and the battery backup portion 14e are engaged together, both would be positioned below the ceiling. In the exemplary embodiment, both would be at least partially visible. Thus, the exemplary the light emitter portion 12e and the battery backup portion 14e are disclosed such that the battery backup portion 14e provides a power backup while not compromising the profile of the lighting arrangement 10e on the ceiling.

The exemplary light emitter portion 12e also includes an inner lens 186e. The exemplary inner lens 186e is fixed to the circuit board 111e and encloses the LEDs 108e. A gasket can be positioned between the exemplary inner lens 186e and the exemplary the circuit board 111e.

The exemplary light emitter portion 12e includes at least one mounting aperture 182e centered on a first axis 184e. The exemplary first axis 184e is transverse to the ceiling of the dwelling place when the light emitter portion 12e is engaged with the junction box. For example, the first axis 184e can be in a vertical orientation when the light emitter portion 12e is engaged with the junction box and the ceiling can be horizontal. The exemplary at least one mounting aperture 182e is defined in the trim 128e and is configured to receive a fastener 178e for interconnecting the light emitter portion 12e to the junction box. The exemplary fastener 178e passes through the trim 128e and includes a head 180e contacting the trim 128e. The exemplary fastener 178e threadingly engages the junction box.

The battery backup portion 14e includes at least one mounting aperture 188e centered on a second axis 190e. The exemplary second axis 190e is transverse to the ceiling of the dwelling place when the battery backup portion 14e is engaged with the light emitter portion 12e and the light emitter portion 12e is engaged with the junction box. The first axis 184e extends through the at least one mounting aperture 188e of the battery backup portion 14e when the battery backup portion 14e is engaged with the light emitter portion 12e and the light emitter portion 12e is engaged with the junction box. The exemplary fastener 178e also passes through the at least one mounting aperture 188e of the battery backup portion 14e.

In the sixth exemplary embodiment, a second mounting aperture 192e of the light emitter portion 12e is centered on an axis 194e. The exemplary axes 184e and 194e both extend through the mounting aperture 188e of the battery backup portion 14e when the battery backup portion 14e is engaged with the light emitter portion 12e and the light emitter portion 12e is engaged with the junction box. The exemplary mounting aperture of the battery backup portion 14e is further defined as a single aperture through which the axes 184e and 194e extend. Fasteners 178e and 200e extend through the apertures 182e and 192e, and aperture 188e, and threadingly engage the junction box. The exemplary mounting apertures 182e, 188e, 192e are unthreaded through-apertures. As shown in the Figures, the 182e, 192e communicate with slots so that after fasteners 178e and 200e are received, the lighting arrangement 10e can be rotated slightly to stiffen the interconnection with the junction box.

The light emitter portion 12e and the battery backup portion 14e can include one or more locking arms and one or more slots configured to receive the one or more locking arms. In the exemplary embodiment, the light emitter portion 12e includes slots 202e and 204e in the trim 128e and the battery backup portion 14e includes locking arms, such as locking arm 206e. The exemplary slots 202e and 204e are configured to receive the exemplary locking arms. The locking arms are received in the slots to engage the light emitter portion 12e and the battery backup portion 14e together. The locking arms are received in the slots by moving the light emitter portion 12e and the battery backup portion 14e closer to one another along the axis 184e.

The exemplary locking arms are positioned on a first side of the battery backup portion 14e that confronts the light emitter portion 12e when the battery backup portion 14e and the light emitter portion 12e are interconnected. The battery backup portion 14e further includes at least one battery compartment and at least one door selectively closing the at least one battery compartment. Battery compartments are referred to as pockets in the fourth embodiment of the present disclosure and the terms are synonymous. Pockets as shown in FIG. 16 can be incorporated in the battery backup portion 14e. A door in the present embodiment is referenced at 208e. The exemplary doors of the battery backup portion 14e are positioned on a second side of the battery backup portion 14e that is opposite the first side along the axis 184e. The plurality of battery compartments are positioned in spaced relation to one another about a central axis of the battery backup portion 14e and are positioned radially outward of the axis 184e.

The exemplary lighting arrangement 10e also includes an alerting LED 62e and a test button 60e. The exemplary test button 60e is in electronic communication with the battery backup portion 14e and configured such that pressing of the test button 60e places the LED 62e in electronic communication with the battery backup portion 14e. The LED 62e and the test button 60e are mounted in the battery backup portion 14e. The test button 60e and the LED 62e are directed outward along an axis 210e that extends in a first plane that is perpendicular to a second plane containing the axis 184e. The exemplary test button 60e extends past a maximum outer diameter of the trim 128e of the light emitter portion 12e.

The exemplary lighting arrangement 10e also includes a diffuser 211e. The exemplary diffuser 211e is selectively engageable with the trim 128e. The exemplary diffuser 211e includes slots that extend about an a central axis of the diffuser 211e and define a vertically-oriented opening. An exemplary slot 212e with an opening 214e is referenced in the Figures. The exemplary trim 128e includes protuberances to engage the slots. A protuberance 216e is referenced in the Figures. The diffuser 211e is raised with the protuberances aligned with the openings and then rotated so that the protuberance is moved along the slot. The exemplary diffuser 211e covers the plurality of LEDs 108e in the array string, the circuitry 110e, and the mounting apertures 182e and 202e of the light emitter portion 12e when engaged with the trim 128e.

In a first exemplary process of assembly, the diffuser 211e can be rotated and removed from the light emitter portion 12e. Wiring of the circuitry can be spliced and connected to wiring in the junction box. FIGS. 2 and 3 are incorporated here as the wiring leads from the light emitter portion 12e are the same as the wiring leads of the light emitter portion 12. After the wire connections are completed, the mounting apertures 182e, 192e of the light emitter portion 12e can be aligned with threaded apertures in the junction box. Fasteners 178e, 200e can then be inserted through mounting apertures 182e, 192e to threadingly engage the threaded apertures in the junction box. As shown in the Figures, the apertures 182e, 192e communicate with slots so that after fasteners 178e and 200e are received, the lighting arrangement 10e can be rotated slightly to stiffen the interconnection with the junction box. The fasteners 178e, 200e can be turned until the upper edge 218e of the trim 128e contacts the ceiling. The diffuser 211e can then be raised to engage the protuberances in the trim 128e and rotated until the protuberances engage the ends of the slots.

In a second exemplary process of assembly, the input wiring of the battery backup potion 14e can be spliced and connected to wiring in the junction box to connect to the primary AC source (such as the grid). In FIG. 5, the input to the battery backup portion 14e is referenced at 172. Next, wiring of the light emitter portion 12e can be spliced to the output wiring of the battery backup potion 14e. FIGS. 2 and 3 are incorporated here as the wiring leads from the light emitter portion 12e are the same as the wiring leads of the light emitter portion 12. The diffuser 211e can then be rotated and removed from the light emitter portion 12e. The battery backup portion 14e and the light emitter portion 12e can then be interconnected by inserting the locking arms (such as locking arm 206e) in the slots (such as slot 202e) and rotated relative to one another. This will align the apertures 182e, 192e with the apertures 188e, 196e. A portion of the battery backup portion 14e is received within the trim 128e of the light emitter portion 12e to reduce the increase in the profile height of the lighting arrangement 10e.

The mounting apertures 182e, 192e of the light emitter portion 12e can then be aligned with threaded apertures in the junction box. Fasteners 178e, 200e can then be inserted through mounting apertures 182e, 192e to threadingly engage the threaded apertures in the junction box. The fasteners 178e, 200e can be turned until the upper edge 220e of the battery backup portion 14e contacts the ceiling. The diffuser 211e can then be raised to engage the protuberances in the trim 128e and rotated until the protuberances engage the ends of the slots. Upon completion of the assembly process, the weight of the battery backup portion 14e rests on the trim 128e. Also, the light emitter portion 12e and the battery backup portion 14e have substantially the same outermost diameter, so the appearance of the lighting arrangement 10e does not significantly change.

It is confirmed that, if desired, the battery backup portion 14e can later be removed from the light emitter portion 12e and the light emitter portion 12e can be reinstalled to the junction box. The light emitter portion 12e or 12d can be mounted directly to the junction box without the respective battery backup portions 14e or 14d, fi desired. The battery backup portions 14d or 14e can be removed either permanently or temporarily to change the rechargeable batteries held in the battery compartments.

While the present disclosure has been described with reference to exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiments disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved. The use of the word "can" in this document is not an assertion that the subject preceeding the word is or is not unimportant or unnecessary or "not critical" relative to anything else in this document. The word "can" is used herein in a positive and affirming sense and no other motive should be presumed. Further, more than one "invention" may be disclosed in the present disclosure; an "invention" is defined by the content of a patent claim and not by what a detailed description of an embodiment.

What is claimed is:

1. A lighting arrangement comprising:
   a light emitter portion having a plurality of light emitting diodes in an array string and circuitry for driving said plurality of light emitting diodes including a rectifier and an IC chip configured to drive said plurality of light emitting diodes with the rectified voltage provided by said rectifier, said light emitter portion also having a trim wherein said plurality of light emitting diodes in said array string and said circuitry mounted on said trim;
   a battery backup portion in electronic communication with said rectifier of said light emitter portion and having: a battery portion with one or more batteries and a converter portion with a DC-AC inverter, said converter portion connected to said rectifier and configured to receive power from said one or more batteries or a primary AC source, and said converter portion including a microcontroller unit, said microcontroller unit configured to route AC power to said rectifier from either the primary AC source or said battery portion when said light emitter portion and said battery backup portion are engaged with one another;
   said light emitter portion configured to be mounted to a junction box and positioned below a ceiling of a dwelling space during use; and
   said battery backup portion configured to be selectively positionable between said light emitter portion and the junction box.

2. The lighting arrangement of claim 1 wherein said light emitter portion is configured to be directly engageable with the junction box without said battery backup and also configured to be indirectly engageable the junction box through said battery backup.

3. The lighting arrangement of claim 1 wherein said battery backup portion is positioned below the ceiling of the dwelling space during use when engaged with said light emitter portion.

4. The lighting arrangement of claim 1 wherein:
   said light emitter portion includes at least one mounting aperture centered on a first axis, said first axis is transverse to the ceiling of the dwelling place when said light emitter portion is engaged with the junction box, said at least one mounting aperture configured to receive a fastener for interconnecting said light emitter portion to the junction box; and said battery backup portion includes at least one mounting aperture centered on a second axis, said second axis transverse to the ceiling of the dwelling place when said battery backup portion is engaged with said light emitter portion and said light emitter portion is engaged with the junction box, said first axis extending through said at least one mounting aperture of said battery backup portion when said battery backup portion is engaged with said light emitter portion and said light emitter portion is engaged with the junction box.

5. The lighting arrangement of claim 4 wherein said first axis and said second axis are collinear when said battery backup portion is engaged with said light emitter portion and said light emitter portion is mounted to the junction box.

6. The lighting arrangement of claim 4 wherein said at least one mounting aperture of said light emitter portion is further defined as a first mounting aperture centered on said first axis and a second mounting aperture centered on a third axis and wherein first axis and said third axis extend through said at least one mounting aperture of said battery backup portion when said battery backup portion is engaged with said light emitter portion and said light emitter portion is engaged with the junction box.

7. The lighting arrangement of claim 6 wherein said at least one mounting aperture of said battery backup portion is further defined as a single aperture through which said first axis and said third axis extend.

8. The lighting arrangement of claim 4 wherein a first of said light emitter portion and said battery backup portion includes one or more locking arms and a second of said light emitter portion and said battery backup portion includes one or more slots configured to receive said one or more locking arms, wherein said one or more locking arms are received in said one or more slots to engage said light emitter portion and said battery backup portion together, and wherein said one or more locking arms are received in said one or more slots by moving said light emitter portion and said battery backup portion closer to one another along said first axis.

9. The lighting arrangement of claim 4 wherein said battery backup portion includes one of at least one locking arm and at least one slot to interconnect with said light emitter portion, said light emitter portion including the other of said at least one locking arm and said at least one slot, said one of said at least one locking arm and said at least one slot included by said battery backup portion positioned on a first side of said battery backup portion that confronts said light emitter portion when said battery backup portion and said light emitter portion are interconnected, wherein said battery backup portion further includes at least one battery compartment and at least one door selectively closing said at least one battery compartment, said at least one door positioned on a second side of said battery backup portion that is opposite said first side along said first axis.

10. The lighting arrangement of claim 4 further comprising:
a light emitting diode; and
a test button in electronic communication with said battery backup portion and configured such that pressing of the test button places said light emitting diode in electronic communication with said battery backup portion, wherein said light emitting diode and said test button are mounted in said battery backup portion, and wherein said test button and said light emitting diode are directed outward along a second axis that extends in a first plane that is perpendicular to a second plane containing said first axis.

11. The lighting arrangement of claim 10 wherein said test button is further defined as extending past a maximum outer diameter of said trim of said light emitter portion.

12. The lighting arrangement of claim 4 wherein said battery backup portion further comprises a plurality of battery compartments and a plurality of openable doors each configured to selectively enclose one of said plurality of battery compartments, wherein said plurality of battery compartments are positioned in spaced relation to one another about a central axis of said battery backup portion, and wherein said plurality of battery compartments are positioned radially outward of said first axis.

13. The lighting arrangement of claim 4 further comprising:
a diffuser selectively engageable with said trim and covering said plurality of light emitting diodes in said array string, said circuitry, and said at least one mounting aperture of said light emitter portion when engaged with said trim.

14. The lighting arrangement of claim 4 wherein said at least one mounting aperture of said light emitter portion and said at least one mounting aperture of said battery backup portion are further defined as unthreaded through-apertures.

15. The lighting arrangement of claim 1 wherein a weight of said battery backup portion rests on said trim when said battery backup portion is engaged with said light emitter portion and said light emitter portion is engaged with the junction box.

16. The lighting arrangement of claim 1 wherein said battery backup portion is further defined as at least partially receivable within said trim of said light emitter portion.

17. The lighting arrangement of claim 1 wherein said light emitter portion and said battery backup portion are further defined as having substantially the same outermost diameter.

18. The lighting arrangement of claim 1 wherein said battery backup further comprises a plurality of battery compartments and a plurality of openable doors each configured to selectively enclose one of said plurality of battery compartments and wherein said plurality of battery compartments are positioned in spaced relation to one another about a central axis of said battery backup portion.

19. The lighting arrangement of claim 1 further comprising:
at least one fastener passing through said trim and including a head contacting said trim; and
a diffuser selectively engageable with said trim and covering said plurality of light emitting diodes in said array string, said circuitry, and said head of said fastener.

20. The lighting arrangement of claim 19 wherein said fastener is further defined as also passing through said battery backup portion.

* * * * *